US005613354A

United States Patent [19]
Foster

[11] Patent Number: 5,613,354
[45] Date of Patent: Mar. 25, 1997

[54] CLEARING APPARATUS AND CARRIAGE FOR CLEARING APPARATUS

[76] Inventor: Thomas E. Foster, 1800 Loop 360 South, Austin, Tex. 78746

[21] Appl. No.: 527,448

[22] Filed: Sep. 13, 1995

[51] Int. Cl.$^6$ ............................................. A01D 67/00
[52] U.S. Cl. ........................... 56/16.7; 56/12.7; 56/17.2; 56/473.5; 56/DIG. 18
[58] Field of Search .................................... 56/12.1, 12.7, 56/12.8, 16.7, 17.2, 16.9, 17.5, 202, 400.14, DIG. 7, DIG. 18, 473.5; 30/276

[56] References Cited

U.S. PATENT DOCUMENTS

| | | | |
|---|---|---|---|
| 2,638,730 | 5/1953 | Davidson | 56/400.14 |
| 3,221,481 | 12/1965 | Mattson et al. | 56/25.4 |
| 3,788,049 | 1/1974 | Ehrlich | 56/16.9 |
| 3,977,078 | 8/1976 | Pittinger, Jr. | 30/276 |
| 4,009,560 | 3/1977 | Wells | 56/400.01 |
| 4,182,100 | 1/1980 | Letter | 56/16.7 |
| 4,224,784 | 9/1980 | Hansen et al. | 56/16.9 |
| 4,358,123 | 11/1982 | Richards | 280/47.13 |
| 4,442,659 | 4/1984 | Enbusk | 56/12.7 |
| 4,512,143 | 4/1985 | Jimenez | 56/16.7 |
| 4,587,800 | 5/1986 | Jimenez | 56/16.9 |
| 4,624,321 | 11/1986 | Pinto | 172/15 |
| 4,679,385 | 7/1987 | Carmine | 56/16.9 |
| 4,688,376 | 8/1987 | Wolfe, Sr. | 56/16.7 |
| 4,703,613 | 11/1987 | Raymond | 56/12.7 |
| 4,704,849 | 11/1987 | Gilbert et al. | 56/17.5 |
| 4,712,363 | 12/1987 | Claborn | 56/16.7 |
| 4,756,147 | 7/1988 | Savell | 56/16.7 |
| 4,796,415 | 1/1989 | Moore | 56/16.9 |
| 4,802,327 | 2/1989 | Roberts | 56/15.2 |
| 4,829,755 | 5/1989 | Nance | 56/17.1 |
| 4,845,929 | 7/1989 | Kawasaki et al. | 56/17.5 |
| 4,891,931 | 1/1990 | Holland | 56/16.7 |
| 4,914,899 | 4/1990 | Carmine | 56/16.7 |
| 4,922,694 | 5/1990 | Emoto | 56/16.7 |
| 4,936,886 | 6/1990 | Quillen | 56/16.7 |
| 4,953,294 | 9/1990 | Dohse | 30/276 |
| 4,981,012 | 1/1991 | Claborn | 56/16.9 |
| 5,279,102 | 1/1994 | Foster | 56/12.7 |
| 5,408,816 | 4/1995 | Cartier | 56/17.5 |

OTHER PUBLICATIONS

Owners Manual by "Inertia Dynamics Corporation," idc 500 530, pp. 1–16 (Jun. 1991).

*Primary Examiner*—Terry Lee Melius
*Attorney, Agent, or Firm*—Arnold, White & Durkee

[57] ABSTRACT

A clearing apparatus comprising a clearing device for use in clearing operations, a carriage to which the clearing device is mounted for the carriage to support the clearing device during use, and a handle for use in guiding the apparatus during use. The clearing device comprises an elongated support member, a clearing head mounted at a leading end of the support member, a power unit mounted at a trailing end of the support member, and a drive connection for connecting the power unit to the clearing head. The carriage comprises a frame, a single support wheel having a wheel axis about which the support wheel is rotatably mounted on the frame to support the frame during use, and a pivot mount mounting the clearing device to the frame such that the clearing apparatus can be supported proximate its center of gravity on the support wheel during use. The pivot mount has a pivot axis extending generally parallel to the wheel axis, and the clearing device is pivotally displaceable about the pivot axis for adjusting the position of the center of gravity of the clearing device relatively to the wheel axis. The carriage has a locking device for locking the clearing device relatively to the pivot mount in a desired adjusted position. The handle is positioned for an operator grasping the handle for guiding the apparatus during use, to be positioned to one side of the support wheel and at least partially in line with part of an axial projection of the support wheel during normal use.

51 Claims, 4 Drawing Sheets

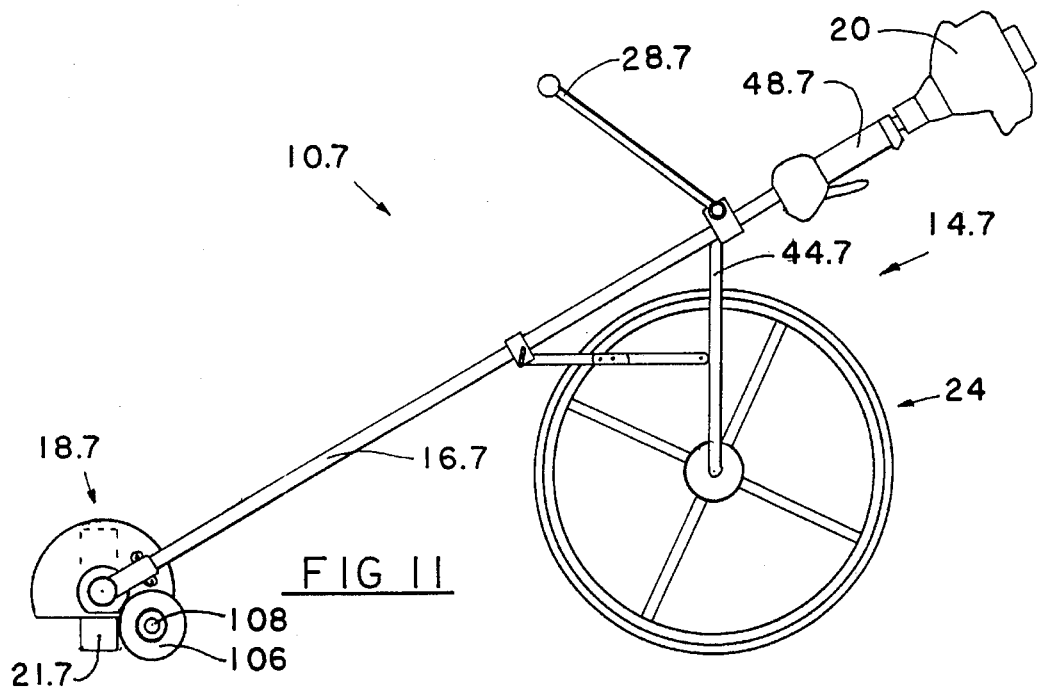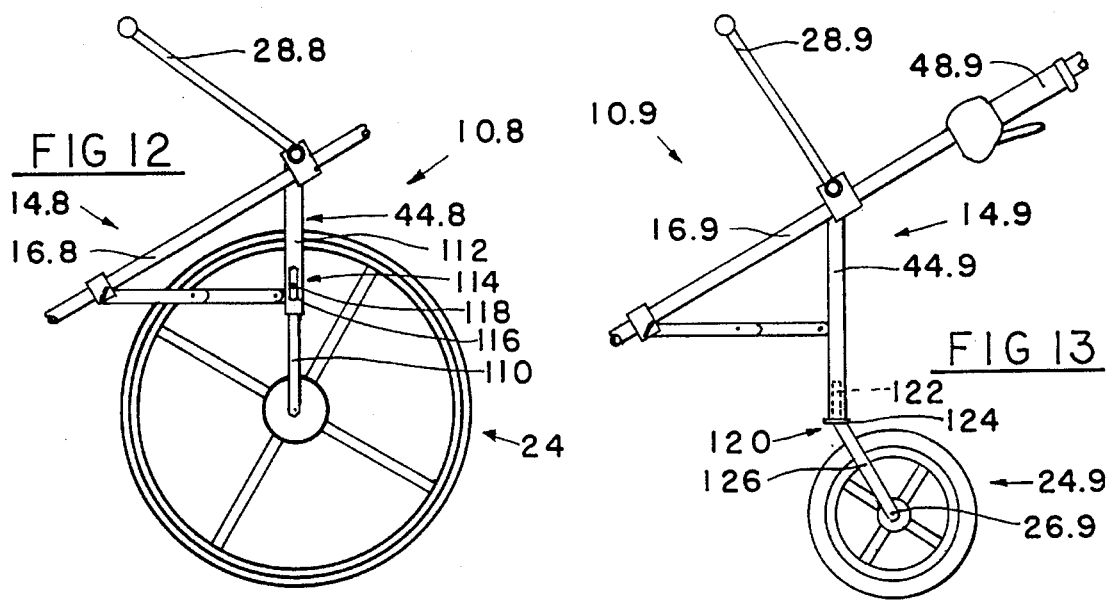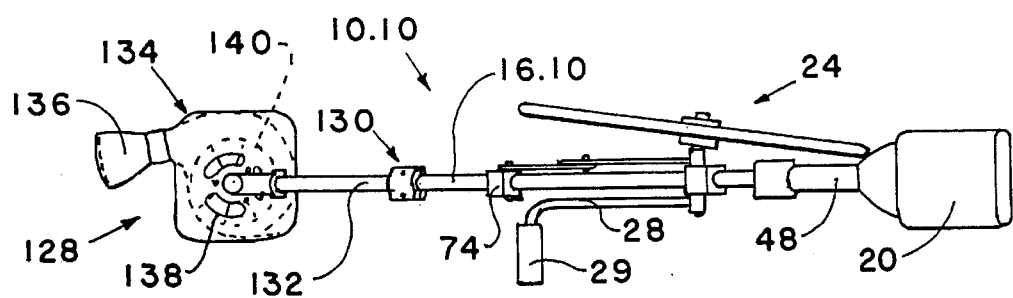

CLEARING APPARATUS AND CARRIAGE FOR CLEARING APPARATUS

BACKGROUND OF THE INVENTION

This invention relates to a clearing apparatus for use in clearing operations. The invention further relates to a carriage for use in supporting a clearing apparatus.

The clearing apparatus of this invention is, in one aspect, in the form of a trimmer apparatus. The clearing apparatus is, in another aspect, in the form of a blower apparatus. The clearing apparatus may also, in another aspect, be convertible between the various aspects of the invention.

Where the clearing apparatus of this invention is in the form of a trimmer apparatus, it has particular application in the cutting of vegetation in the form of grass, weeds, shrubs and the like. The trimmer apparatus has particular application in regard to a trimmer or cutter of the type which uses a cutting line for cutting or trimming vegetation. The trimmer apparatus can, however, also have application in regard to a trimmer which uses a cutter blade or various types of cutter blades for cutting or trimming vegetation.

Where the clearing apparatus of this invention is in the form of a blower apparatus, it may have application in clearing indoors or outdoors areas of dust, debris, leaves, etc.

Applicant is aware of a number of prior patents which disclose various forms of wheeled carriages for supporting trimmers. These patents include U.S. Pat. Nos. 3,221,481—Mattson et al.; 4,845,929—Saki et al.; 3,977,078—Pittenjar; 4,936,886—Quillen; 4,182,100—Litter; 4,891,931—Holland; 4,442,659—Enbusk; 4,981,012—Claiborne; 4,829,755—Nance; and 5,408,816 Cartier. These patents do, for the most part, present a number of disadvantages.

Some of these disadvantages are that the operator has to support a major portion of the weight of the apparatus; that the apparatus is not supported near its center of gravity; that the apparatus is designed to be operated lawn-mower fashion so that lateral maneuverability of the apparatus is limited; that the operator can not position himself near the center of gravity of the apparatus during use; that the apparatus can not readily traverse obstacles during use; that the apparatus is bulky and difficult to handle, and that the apparatus restricts the reach of the clearing head of the apparatus during use.

Applicant is also the patentee of U.S. Pat. No. 5,279,102 which issued Jan. 18, 1994.

Applicant's prior patent relates to a clearing apparatus and to a carriage for a clearing apparatus which can reduce or overcome one or more of the disadvantages presented by the prior patents discussed above, and by the prior patents and the publication made of record during prosecution of Applicant's U.S. Pat. No. 5,279,102.

Applicant's present invention relates to additions, improvements or developments in or relating to some aspects of a clearing apparatus and a carriage for a clearing apparatus of the general type described in Applicant's prior U.S. Pat. No. 5,279,102.

In particular, certain aspects of the present invention are designed to allow or facilitate adjustment of the position of the center of gravity of the clearing device relatively to the axis of the support wheel, and other aspects of the present invention are designed to allow collapsing of the clearing apparatus and/or carriage into a compact unit for storage, transport, maintenance, substitution of components, starting, etc.

Applicant incorporates Applicant's prior U.S. Pat. No. 5,279,102 by reference into this application. Applicant also hereby makes of record all prior art of record in Applicant's prior U.S. Pat. No. 5,279,102.

In accordance with one aspect of the invention, there is provided a clearing apparatus comprising a clearing device for use in clearing operations, a carriage to which the clearing device is mounted for the carriage to support the clearing device during use, and a handle for use in guiding the apparatus during use;

the clearing device comprising an elongated support member, a clearing head mounted at a leading end of the support member, a power unit mounted at a trailing end of the support member, and a drive connection for connecting the power unit to the clearing head;

the carriage comprising a frame, a single support wheel having a wheel axis about which the support wheel is rotatably mounted on the frame to support the frame during use, and a pivot mount mounting the clearing device to the frame such that the clearing apparatus can be supported proximate its center of gravity on the support wheel during use;

the pivot mount having a pivot axis extending generally parallel to the wheel axis, and the clearing device being pivotally displaceable about the pivot axis for adjusting the position of the center of gravity of the clearing device relatively to the wheel axis;

the carriage having a locking device for locking the clearing device relatively to the pivot mount in a desired adjusted position; and the handle being positioned for an operator grasping the handle for guiding the apparatus during use, to be positioned to one side of the support wheel and at least partially in line with part of an axial projection of the support wheel during normal use.

The elongated support member may be an elongated support member of any suitable type or of any conventional type for use in clearing devices. Thus, for example, the elongated support member may be in the form of a housing which houses or supports the drive connection. The housing may, for example, be tubular and of circular, oval, square or rectangular section. The housing may also be of channel section, or the like.

In a presently preferred embodiment, the elongated support member is a tubular housing of circular section which houses the drive connection.

The drive connection may be a drive connection of any suitable or conventional type to operatively connect the clearing head and the power unit.

Thus, for example, the drive connection may comprise or include a rigid drive shaft, a flexible drive shaft, a semi-flexible drive shaft, a drive train or the like, for connecting a power unit in the form of a motor to the clearing head.

Where the power unit is a battery and the clearing head has an electrical motor associated with it to drive the clearing device, the drive connection comprises electrical leads or other power connections leading from the battery to the electrical motor.

The pivot mount may be a bracket or clamp of any suitable or conventional type for pivotally mounting the clearing device to the frame.

In one preferred embodiment the pivot mount comprises a mounting clamp for clamping onto the elongated support member, and a pivot shaft which extends from the mounting clamp to define the pivot axis.

In this embodiment, the frame includes a pivot sleeve which is pivotally mounted on the pivot shaft to allow the pivot sleeve to pivot relatively to the pivot shaft and thus allow the clearing device to pivot relatively to the frame and thus relatively to the wheel axis.

In an alternative preferred embodiment, the pivot mount may comprise a mounting clamp for engaging the elongated support member, a pivot housing which is fixed to the frame, and a pivot connection between the mounting clamp and the pivot housing to define the pivot axis, and to allow pivotal displacement of the clearing device about the pivot axis relatively to the frame and thus relatively to the wheel axis.

The mounting clamp may be a clamp of any conventional type. Thus, for example, it may be a C-clamp, a G-clamp, a split clamp, or the like.

In one preferred embodiment the mounting clamp comprises a pair of cooperating clamp sections which together define a mounting bore for receiving the elongated support member, and which are clamped together to mount the mounting clamp onto the elongated support member.

In this embodiment of the invention, to allow the carriage to be used with a variety of clearing devices having elongated support members of differing sizes and differing cross-sectional shapes, a variety of clamp members to define different required mounting bores may be used, or master clamp sections may be used with shims or bushings of different shapes and sections.

The pivot axis is preferably at right angles or substantially at right angles to the elongated axis of the elongated support member.

The pivot axis extends generally parallel to the wheel axis so that the clearing device can be pivotally displaced about the pivot axis in the leading direction towards the clearing head, or in the trailing direction away from the clearing head relatively to the wheel axis, to adjust the position of the center of gravity of the clearing device relatively to the wheel axis.

Such an adjustment can readily be made if the user, for example, prefers to have the center of gravity of the clearing apparatus slightly forward or slightly backward of the wheel axis.

Such an adjustment can also readily be made if the position of the center of gravity is changed because, for example, the clearing head is changed for a clearing head of a different size, shape or mass.

Such an adjustment would therefore be desirable where a clearing head in the form of cutter head of the line type, is replaced with a heavier duty cutter head of the line type, or is replaced with different types of heavier duty cutter heads of the blade type for cutting vegetation in the form of shrubs, brush, weeds, small trees, and the like.

Such an adjustment could also generally be desirable or advisable where a cutter head is replaced with an edger head for edging, or with a different guard for the cutter head, or with a blower head for blowing.

Such an adjustment capability is also advantageous for mounting clearing devices of different types onto the carriage. For example, clearing devices which have elongated support members of different lengths, clearing devices which have differing angles between the axes of the elongated support members and the clearing heads, and clearing devices which have elongated support members which are not linear.

Where the support wheel axis is substantially perpendicular to the elongated axis of the elongated support member, the pivot axis would be substantially parallel to the wheel axis.

The plane of the wheel is, however, preferably at an angle to the elongated axis of the elongated support member to allow an operator during use to walk generally in the direction of the clearing head and have the wheel move in a track generally parallel to his path.

Where the plane of the wheel is at an angle to the elongated axis of the elongated support member, the pivot axis will not be substantially parallel to the wheel axis, but will be generally parallel to the wheel axis.

In one preferred embodiment, the plane of the wheel is at an angle of between about 5 and about 15 degrees to the elongated axis of the elongated support member. In this embodiment the pivot axis would also tend to be generally perpendicular to the elongated axis of the elongated support member, and thus would be generally parallel to the wheel axis by being at an angle of generally about 5 to about 15 degrees to the wheel axis.

In one presently preferred embodiment, the plane of the wheel is at an angle of about 10 degrees to the elongated axis of the elongated support member. In this preferred embodiment the pivot axis is likewise preferably at an angle of about 10 degrees to the wheel axis.

In an alternative embodiment of the invention, the plane of the wheel may be at an angle of about 20 degrees to the elongated axis of the elongated support member, and the angle between the generally parallel wheel axis and pivot axis may then be of the same approximate order of about 20 degrees.

However, as long as the pivot axis and wheel axis are substantially parallel or generally parallel, the effective adjustment capability will be maintained.

The locking device for locking the clearing device relatively to the pivot mount in a desired adjusted position, may be a locking device of any conventional or suitable type.

Thus, for example, the locking device may be a locking sleeve, a locking clamp, or locking pins for preventing pivotal movement about the pivot axis when activated.

In this example of the invention, the locking sleeve, clamp, or pins may operate directly between the pivot shaft and the pivot sleeve or directly on the pivot connection.

In one preferred embodiment the locking device may comprise an adjustable locking strut extending between the frame and the clearing device.

The adjustable locking strut may be adjustable by being telescopic, by being a threaded engagement, by being otherwise adjustable in effective length, and/or by being displaceable relatively to the frame or relatively to the elongated support member.

In a presently preferred embodiment, the locking strut has a sliding clamp which is slidably engaged with the elongated support member or with the frame, with the sliding clamp including a fastener to fasten the sliding clamp in a desired adjusted position along the elongated support member or along the frame.

In one preferred embodiment, the locking strut comprises an over center locking toggle which is displaceable between a locked operative position and a collapsed position.

While the elongated support member and the support wheel may be mounted to the frame so that their planes are relatively close, applicant prefers to have the elongated axis of the elongated support member laterally spaced to one side of the plane of the support wheel.

This type of lateral spacing is advantageous not only where the plane of the support wheel is substantially parallel to the elongated axis of the elongated member, but also where the plane of the support wheel is at an angle of between about 0 to 20 degrees to the elongated axis of the elongated support member as described above.

Such lateral spacing provides more clearance for the foot of an operator during use. In addition, by then leaning the clearing apparatus slightly towards the operator during use better feel and control may be obtained. The center of gravity of the apparatus would then be close to the operator while the wheel would be spaced from the operator by about 4 to 6 inches.

While the lateral spacing can vary over a range, it is conveniently between about 2 and about 10 inches, and preferably about 4 or 5 inches.

In one preferred embodiment of the invention, the handle may be arranged for an operator holding the handle to be positioned proximate the center of gravity of the apparatus during use. Thus for an operator to operate the apparatus during use, the operator will be positioned or will be standing proximate the support wheel. Thus the operator will be positioned at least partially or substantially in line with part of an axial projection of the support wheel during normal use.

In a preferred embodiment, the handle is positioned so that an operator grasping the handle for guiding the apparatus during use, will be partially in line with, or alternatively substantially in line with, an axial extension of the wheel axis during use.

The handle may be positioned proximate the center of gravity of the apparatus. Preferably, the handle may be positioned to extend forwardly of the center of gravity of the apparatus in the direction of the clearing head during use.

In different embodiments of the invention, the handle may form part of the carriage, may form part of the clearing device, may be mounted on the pivot mount, may be mounted on the frame, or may be mounted on the elongated support member of the clearing device.

In an embodiment of the invention, the handle may comprise a guide handle as described for use in guiding the apparatus, and a control handle for use in controlling the apparatus. The control handle may preferably be provided to be on the trailing side of the center of gravity of the apparatus during use.

In one embodiment of the invention, the control handle may be mounted on the elongated support member between the power unit and the carriage. In an alternative embodiment of the invention, the control handle may be mounted on the trailing side of the power unit. The control handle may also be mounted on the power unit, on the frame, on the carriage, on the pivot mount, or on the guide handle.

The control handle may preferably include a throttle control or switch or the like for controlling the power unit.

In one preferred embodiment of the invention, the guide handle and control handle may be positioned so that when an operator grasps the two handles to operate the apparatus, he or she will be positioned proximate the center of gravity of the apparatus. Thus the operator will preferably be positioned to one side of the support wheel and partially in line with an axial projection of the axis of the wheel.

The guide handle and the control handle are preferably displaceable relatively to each other and also relatively to the carrier device, to allow for adjustment of the height and positioning of the handles for different sized operators and for different types of clearing devices.

In a preferred embodiment the guide and control handles are displaceably mounted on the pivot mount. Thus they may, for example, be mounted on the pivot mount clamp or on the pivot mount housing, or may comprise part of the pivot mount or pivot mount housing.

In an embodiment of the invention, the elongated support member may be continuously rotatable about its elongated axis so that the tilt of the cutter head may be varied during use, and may be clamped in a desired position. In an alternative embodiment of the invention, the elongated support member may be rotatable about its elongated axis in a limited stepwise movement. Thus, the tilt of the clearing head to the ground can be adjusted stepwise for specific angles to be provided. In a further embodiment, the elongated support member may be fixed so that it cannot rotate.

In an embodiment of the invention, the clearing apparatus may include a pivot displacement mechanism to permit pivotal displacement of the elongated axis of the support tube relative to the plane of the support wheel. Such pivotal displacement may be a random or continuous displacement where the support tube can be displaced pivotally over a desired range and locked at any point in the range. Alternatively, the pivot displacement may be a stepwise displacement whereby the support tube can be pivotally displaced in a stepwise manner for particular applications. In this embodiment of the invention, the pivot displacement mechanism would include a plurality of locking positions in which the pivotal displacement of the support tube can be locked. This embodiment of the invention can have particular application where the support tube is pivotally displaced and positioned relatively to the plane of the support wheel when, for example, the clearing head is mounted in a vertically oriented clearing position for a particular application such as edging. This embodiment can also have application when the clearing head is in a horizontal clearing position, and a slight angle of the plane of the wheel to the vertical plane of the support tube allows the operator to move forward while operating the apparatus in a more comfortable position.

In an alternative embodiment of the invention, the clearing head may be adjustable about the axis of the elongated support member to adjust the inclination of the clearing head relatively to the plane of the wheel.

While guiding of the clearing head relatively to the ground is normally relatively easy, the apparatus may, if desired, include a height guide wheel or castor or skid to assist in guiding the height of the clearing head above the ground during use. Such a height guide wheel or castor or skid would tend to be positioned close to the clearing head and may, for example, be mounted on the support tube or on the clearing head.

In one embodiment of the invention, the guide handle and the control handle may both be substantially in line with the support tube.

In an alternative example of the invention, the guide handle may extend laterally from the vertical plane of the support tube.

In one embodiment of the invention, the position of the guide handle relative to the center of gravity of the apparatus, may be adjustable to suit the requirements of the operator. Any standard adjustment means may be provided for adjusting the position and height of the guide handle.

Where the guide handle extends laterally of the vertical plane of the support tube, the guide handle may extend to one side or to the other for right-handed or left-handed operation. Alternatively, the guide handle may be in the form of a T-shape so that it may be operated in a left-handed mode or a right-handed mode, as desired.

The power unit may comprise a motor of any conventional or suitable type for driving the clearing head during use.

Thus, for example, the power unit may comprise a gas motor, an electrical motor, or the like.

In an alternative example of the invention the power unit may comprise a battery. In this example of the invention, an electric motor may form part of the power unit, and the clearing device would then have a drive connection such as a drive shaft or the like for connecting the clearing head to the electric motor. Alternatively, an electric motor may form part of the clearing head, in which case the drive connection would comprise electrical leads to conduct electricity from the battery to the electric motor at the clearing head.

The invention further extends to a carriage for supporting a clearing device of the type having an elongated support member, a clearing head mounted at one end of the elongated support member, a power unit mounted proximate the other end of the elongated support member, and a drive connection for connecting the power unit to the clearing head;

the carriage comprising a frame, a single support wheel having a wheel axis about which the support wheel is rotatably mounted on the frame to support the frame during use, and a pivot mount for pivotally mounting an elongated support tube of such a clearing device on the frame for the support wheel to support the frame and such a mounted clearing device proximate the center of gravity of the carriage and such a mounted clearing device during use;

the pivot mount having a pivot axis extending generally parallel to the wheel axis to allow such a mounted clearing device to be pivotally displaceable about the pivot axis for adjusting the position of the center of gravity of such a clearing device relatively to the wheel axis;

the carriage having a locking device for locking such a mounted clearing device relatively to the pivot mount in a desired adjusted position during use;

and the carriage having a handle to be grasped by an operator for guiding the carriage during use, the handle being positioned so that an operator grasping the handle for guiding the carriage during use, will be positioned to one side of the support wheel and at least partially in line with part of an axial projection of the support wheel during use.

In accordance with another aspect of the invention, the invention extends to a clearing apparatus comprising a clearing device for use in clearing operations, a carriage to which the clearing device is mounted for the carriage to support the clearing device during use, and a handle for use in guiding the apparatus during use;

the clearing device comprising an elongated support member, a clearing head mounted at a leading end of the support member, a power unit mounted at a trailing end of the support member, and a drive connection for connecting the power unit to the clearing head;

the carriage comprising a frame, a single support wheel having a wheel axis about which the support wheel is rotatably mounted on the frame to support the frame during use, and a pivot mount mounting the clearing device to the frame such that the clearing apparatus can be supported proximate its center of gravity on the support wheel during use;

the pivot mount having a pivot axis extending generally parallel to the wheel axis, and the clearing device being pivotally displaceable about the pivot axis to allow the clearing device and frame to be pivotally displaced about the wheel axis between an operative position where the clearing apparatus is supported proximate its center of gravity on the support wheel during use, and a compact collapsed inoperative position.

The support wheel may be vertical during use or may be angled from just off of vertical to up to about 30° or more during use and will still support the apparatus, but the greater the angle, the greater the side load on the wheel.

The invention further extends to a carriage for supporting a clearing device of the type comprising an elongated support member, a clearing head mounted at a leading end of the support member, a power unit mounted at a trailing end of the support member, and a drive connection for connecting the power unit to the clearing head;

the carriage comprising a frame, a single support wheel having a wheel axis about which the support wheel is rotatably mounted on the frame to support the frame during use, and a mount bracket for mounting an elongated support member of such a clearing device on the frame for the support wheel to support the carriage and such a mounted clearing device proximate the net center of gravity of the carriage and such a mounted clearing device during use;

the frame comprising a main strut, a mounting strut which is pivotally connected to the main strut to be adjustable relatively to the main strut for adjusting the position of the center of gravity of such a mounted clearing device relatively to the wheel axis for use, and a locking strut to lock the main strut relatively to the mounting strut in a selected adjusted position;

and the carriage having a handle to be grasped by an operator for guiding the carriage during use, the handle being positioned so that an operator grasping the handle for guiding the carriage will be positioned to one side of the support wheel and substantially in line with part of an axial projection of the support wheel during normal use.

The mount bracket may be a bracket of any conventional or suitable type for mounting an elongated support member to the carriage.

Thus, by way of example only, the mount bracket may comprise one or more C-clamps, G-clamps, split clamps, over-center locking clamps, or the like.

In a preferred embodiment of the invention, the mount bracket comprises a pair of brackets which are fixed to the mounting strut for mounting an elongated support member of such a clearing device to the mounting strut.

In an alternative embodiment of the invention, the mount bracket may form a weld region on which such an elongated support member can be mounted by welding or the like.

In one embodiment of the invention, the mounting strut of the carriage may comprise part of an elongated support member of a clearing device. In this embodiment, the elongated support member of the clearing device thus constitutes part of the frame of the carriage.

In accordance with one aspect of the invention, the carriage of this invention and/or the clearing apparatus of this invention, may have the support wheel mounted to the frame as a castor wheel.

This arrangement provides the advantage that as the clearing apparatus, or the carriage, as the case may be, is used, the castor wheel will automatically trail the direction of movement so that movement is enhanced in all directions of intended use. This can also be of particular advantage where the clearing apparatus of this invention is used in an edge trimmer mode.

In accordance with another aspect, the invention extends to a carriage for supporting a clearing device of the type comprising an elongated support member, a clearing head mounted at a leading end of the support member, a power unit mounted at a trailing end of the support member, and a drive connection for connecting the power unit to the clearing head;

the carriage comprising a frame, a single support wheel having a wheel axis about which the support wheel is rotatably mounted on the frame to support the frame during use, and a mount bracket for mounting an elongated support member of such a clearing device on the frame for the support wheel to support the carriage and such a mounted clearing device proximate the net center of gravity of the carriage and such a mounted clearing device during use;

the frame comprising a main strut, and a mounting strut which is connected to the main strut, the main strut including a resilient portion to provide a resilient relationship between the support wheel and a mounted clearing device during use;

and the carriage having a handle to be grasped by an operator for guiding the carriage during use, the handle being positioned so that an operator grasping the handle for guiding the carriage will be positioned to one side of the support wheel and substantially in line with part of an axial projection of the support wheel during normal use.

In this aspect of the invention, the frame may further include a stabilizing strut extending between the main strut and the mounting strut to guide the movement of the resilient portion during use.

In different aspects of this embodiment of the invention, the main strut which includes the resilient portion, may be a strut which would extend generally upwardly from the support wheel axis during use, may be a strut which would extend generally horizontally during use, or may be a strut which would extend generally parallel to an elongated support member of a clearing device when mounted to the carriage.

In a preferred embodiment of the invention, the main strut, mounting strut and stabilizing strut may be arranged in a triangular configuration, with the stabilizing strut extending generally upwardly from the wheel axis during use, with the main strut extending generally horizontally from the stabilizing strut or from the wheel axis during use, and with the mounting strut pivotally connected or fixedly connected to the free ends of the stabilizing and main struts.

The resilient portion may be in the form of any form of spring, or combination of springs. Thus, for example, it may be in the form of or comprise a torsion spring, a leaf spring, a compression spring, a pneumatic or hydraulic compression or extension system, an elastic or resilient material, or the like.

The stabilizing strut may likewise be of any suitable conventional type. For example, it may comprise telescopic members, or pivoting members which are resiliently associated with each other by means of a spring arrangement, a pneumatic arrangement, a hydraulic arrangement, or the like.

The support wheel of the apparatus or carriage of this invention, may be a wheel of any suitable type.

While the support wheel may be relatively small, the wheel should preferably be relatively large since this will give the greatest height to the axle of the wheel and thus improve the ease of handling of the apparatus. The larger the support wheel, the more readily can the apparatus be steered over or past obstacles such as stones, rocks, and bumps, and the more readily can the apparatus be caused to traverse an uneven terrain.

For rough terrain, the support wheel may, for example, be in the form of a conventional bicycle wheel. In one preferred embodiment of the invention the bicycle wheel may for example be a 20, 24 or 26 inch diameter wheel.

In a presently preferred embodiment the wheel may be a 24 inch diameter wheel of the type used in wheel chairs. In an alternative embodiment, for smooth terrain, the wheel is preferably a 12 inch diameter wheel.

The support wheel may have an inflatable tire. Alternatively, the support wheel may have a solid tire, a foam-filled tire, a semi-pneumatic tire, or the like. For light duty applications, the wheel may be a blow-molded plastic wheel.

The support wheel may be provided with a large number of bicycle type spokes. Alternatively, it may be provided with a relatively low number of broad support spokes, or even a disc which has the axle mounted at its center, and a tire or the like at its periphery. Also, the axle of the wheel can preferably be off-set to one side to allow more clearance on the other side of the wheel.

In accordance with one preferred embodiment of the invention, the clearing apparatus of this invention is in the form of a trimmer apparatus for use in cutting vegetation in the form of grass, weeds, shrubs and the like.

In this preferred embodiment of the invention, the clearing device is in the form of a trimmer device for cutting vegetation, and the clearing head is in the form of a cutter head.

The clearing head may be in the form of any cutter head of any suitable or any conventional type. Thus, for example, the clearing head may comprise a cutter of the line type for use in cutting lighter vegetation such as grass, weeds, smaller shrubs and the like.

Alternatively, the cutter head may comprise a cutter of the blade type having pivotally mounted blades, having a circular blade with annularly arranged or circumferentially spaced teeth, having opposed blade members, having a plurality of cutter chains, or the like, for cutting heavier vegetation such as weeds, shrubs, large shrubs including brush, small trees, stalks, and the like.

In an alternative preferred embodiment of the invention, the clearing apparatus may be in the form of a blower apparatus for supplying a stream of air to clear areas of leaves, grass cuttings, cuttings, debris, dust and the like.

In accordance with this embodiment, the clearing device is in the form of a blower device and has the clearing head in the form of a blower head.

In accordance with yet a further preferred embodiment of the invention, the clearing apparatus may be in the form of a vacuum apparatus for use in clearing areas of leaves, cuttings, grass cuttings, debris, dust and the like.

In accordance with this embodiment, the clearing device is in the form of a vacuum device, and the clearing head is in the form of a vacuum head.

The blower device and the vacuum device of this invention, will utilize many of the relevant features of those devices as described and as illustrated in my prior U.S. Pat. No. 5,279,102.

The clearing head of the clearing device of the clearing apparatus is preferably removably mounted so that the clearing head can be exchanged for clearing heads providing alternative applications in accordance with the invention, or for clearing heads which are of heavier duty or lighter duty type as required.

Thus, for example, where the clearing head is in the form of a cutter head, the cutter head may be removed and replaced, for example, with a blower head for blowing. In other examples, the clearing head may be replaced with alternative types of clearing heads such as reciprocating blades to provide a hedge trimmer function, with tiller blades to provide a tiller function, or with an edger head to provide an edging function.

In one aspect of the invention, the clearing heads may be removably mounted on a leading end of the elongated support member. Each clearing head will therefore have a mounting bore or the like for receiving a leading end of the elongated support member so that it can be removably mounted onto to the leading end of the elongated support member. Any suitable or conventional mounting mechanism may be employed for mounting the clearing head removably on the leading end of the elongated support member.

In an alternative aspect of the invention, each clearing head may have a shaft section extending therefrom for a removable connection to a leading end of the elongated support member to thereby connect the clearing head removably to the elongated support member.

In this aspect of the invention, a clamping sleeve may be provided on the leading end of the elongated support member. The clamping sleeve may have a bore for receiving the shaft section to thereby removably mount the shaft section in the bore of the clamping sleeve. Alternatively, the clamping sleeve may be provided on the shaft section, and may have a bore for removably receiving the leading end of the elongated support member.

The clamping sleeve may have a clamping mechanism of any conventional or suitable type for clamping the shaft section, or the leading end of the elongated support member, as the case may be, in position.

By way of example only, the clamping mechanism may comprise a spring loaded button and a wingnut clamp arrangement, a c-clamp, a g-clamp, or the like.

In one application of the invention, the clamping mechanism may correspond to the type of clamping mechanism currently being used in the replaceable or convertible attachment series currently being marketed in the United States by Ryobi.

In accordance with yet a further embodiment of the invention, the clearing apparatus may be in the form of an edge trimmer apparatus for trimming edges, in which the clearing head is an edge trimmer positioned to be driven in a substantially vertical plane during use, and in which the clearing head includes a guide wheel to guide the height of the edge trimmer during use, and a vertical tab to guide the lateral movement of the cutting blade in order to maintain a constant distance from the edge of a curb or sidewalk, etc.

In this embodiment the elongated support member preferably has a leading portion which is curved to one side to place the plane of the edge trimmer substantially in line with the path of movement of an operator during use.

While the clearing apparatus of this invention will generally tend to have the pivot axis above the wheel axis during use, particular applications of this invention can operate effectively with the pivot axis below the wheel axis during use. Where the pivot axis is below the wheel axis during use, the low center of gravity of the apparatus will tend to improve the stability and handling of the apparatus.

This can be particularly advantageous in applications where the power unit or clearing head, or both, are of larger capacity and thus of larger mass, such as in large shrub, brush and small tree cutters, such as in battery powered cutters, and the like.

Where the clearing apparatus of this invention is in the form of a trimmer apparatus, it may include a clearing device in the form of a trimmer device of any suitable type or of any conventional type.

Thus, for example, the trimmer device may be in the form of any suitable model of trimmer device as made by companies such as Shindaiwa, Echo, Ryobi, John Deere, Toro and the like.

The carriage of the trimmer apparatus may be specifically designed for use with the trimmer devices as they are presently produced by these companies. Alternatively, in certain applications, the trimmer devices as presently provided by some of these companies, may be modified in certain respects to allow them to be used more easily and more effectively in the trimmer apparatus of this invention.

Thus, for example, where a trimmer device such as the heavy duty brush cutter as currently supplied by Shindaiwa in the United States, is used in the trimmer apparatus of this invention, the elongated support member of the Shindaiwa brush cutter may be shortened enough to allow the control handle to be placed above the motor, while the angle of the elongated support member relatively to the ground can remain the same. This modification of the Shindaiwa heavy duty brush cutter allows the handles to be provided at an appropriate height. It also allows the handles to be in line with and equally spaced from the center of gravity for effective control of the cutter head.

Since the clearing apparatus of this invention provides the ability for easily adjusting the position of the center of gravity of the apparatus relatively to the wheel axis, the carriage of this invention can readily be operatively associated with a wide variety of clearing devices.

BRIEF DESCRIPTION OF THE DRAWINGS

Preferred embodiments of the invention are now described by way of example with reference to the drawings.

FIG. 11 shows a side elevation of yet a further alternative embodiment of the invention in the form of an edge trimmer.

FIG. 12 shows a fragmentary, side elevation of yet a further alternative embodiment of the invention in which the frame includes a resilient portion.

FIG. 13 shows a fragmentary side elevation of yet a further alternative embodiment of the invention in which the support wheel is mounted to the frame as a castor wheel.

FIG. 14 shows a plan view of yet a further alternative embodiment of the invention in the form of a blower apparatus.

With reference to FIGS. 1 to 5 of the drawings, reference numeral 10 refers to one preferred embodiment of a clearing apparatus in the form of a trimmer apparatus in accordance with this invention. The trimmer apparatus 10 comprises a trimmer device 12 for use in trimming vegetation such as grass, weeds, shrubs, etc., and a carriage 14 for supporting the trimmer device 12 during use.

Figure 1:
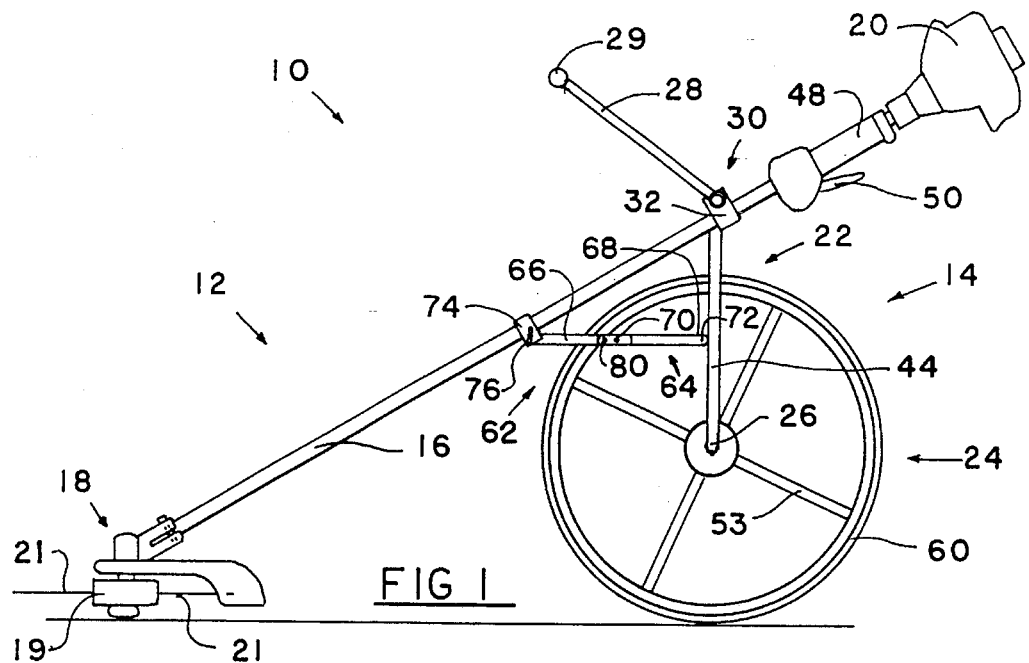
FIG. 1 shows a side elevation of one preferred embodiment of a clearing apparatus in accordance with this invention, in the form of a trimmer apparatus.

The trimmer device 12 is a trimmer of any suitable conventional type, and which comprises an elongated support member in the form of an elongated support tube 16, a cutter head 18 mounted at one end of the support member 16, and a power unit in the form of motor 20 mounted at the other end of the support member 16.

The trimmer device 12 illustrated in FIGS. 1 to 5 of the drawings is a typical straight shaft trimmer device of the type made by Echo wherein the cutter head 18 has cutter means which is of the line-type (which is sometimes referred to as the string type), wherein the motor 20 is a gasoline powered motor, and wherein a drive connection in the form of a drive shaft extends along the bore of the support tube 16 between the motor 20 and the cutter head 18.

The cutter head 18 is shown having a rotatable line housing 19 and cutter lines 21 extending out of the housing 19.

While some heavy duty trimmers use a rigid drive shaft which is housed within a linear support tube 16, a flexible drive shaft may also be used if desired. Where a flexible drive shaft is used, the support tube 16 need not be linear, but may be curved or may have curved portions along its length, as desired.

While the trimmer device 12 is of the type made by Echo, it will be appreciated that the trimmer apparatus of this invention can have application in regard to either straight shaft or curved shaft trimmers made by other manufacturers such as Toro, John Deere, Ryobi, Shindaiwa, and others merely by adapting the pivot mount so that the required trimmer device 12 can be mounted on carriage 14. Depending upon the size of the trimmer device, the carriage 14 may also require a change in shape or configuration so that the trimmer device can be mounted on the carriage in accordance with the objectives of this invention.

While the trimmer device 12 may be various models of trimmer devices as made Echo and by other manufacturers, the presently preferred trimmer devices for use in this particular embodiment of this invention as shown in FIGS. 1 to 5, are the Echo trimmer devices which are supplied under the following model designations: model designation SRM-2100, and model designation SRM 2501.

The carriage 14 comprises a frame 22 and a single support wheel 24 rotatably mounted on the frame 22 to support the frame 22. The support wheel 24 is rotatably mounted on the frame 22 about a wheel axis 26 of the support wheel 24.

The frame 22 has a pivot mount 30 which removably mounts the support tube 16 on the frame 22 such that the trimmer apparatus 10 will be supported substantially at its center of gravity on the support wheel 24 during use. The pivot mount 30 has a guide handle 28 for use in guiding the apparatus 10 during use. The guide handle 28 has a guide handle grip 29 to be gripped in the hand of an operator during use.

Figure 4:
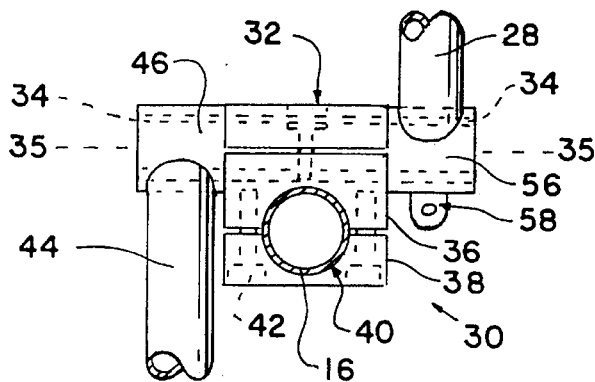
FIG. 4 shows, to an enlarged scale, a fragmentary front elevation of the pivot mount which pivotally mounts the clearing device to the carriage.
Figure 5:
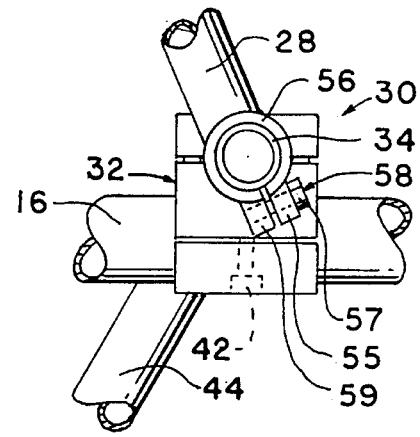
FIG. 5 shows, to the same enlarged scale, a fragmentary side elevation of the pivot mount of FIG. 4.

As can be seen particularly in FIG. 4 and FIG. 5, the pivot mount 30 comprises a mounting clamp 32 for clamping onto the support tube 16, and a pivot shaft 34 which extends from the mounting clamp 32. The pivot shaft 34 has an axis 35 which defines a pivot axis 35 which extends generally parallel to the wheel axis 26.

The trimmer device 12 is mounted on the frame 22 by means of the pivot mount 30 so that the trimmer device 12 can be pivotally displaced relatively to the carriage 14 about the pivot axis 35 for adjusting the position of the center of gravity of the trimmer device 12 (and thus for adjusting the center of gravity of the apparatus 10) relatively to the wheel axis 26, as is described in more detail with reference to FIG. 6.

The mounting clamp 32 comprises a pair of cooperating or complementary clamp sections 36 and 38 which together define a mounting bore 40 for receiving the tube 16, and which are clamped together by means of bolts 42 for mounting the clamp 32 onto the tube 16.

To allow the carriage 14 to be readily used with different types of trimmer devices 12 which may have elongated support tubes 16 of differing cross-sectional areas or differing cross-sectional configurations, suitably shaped pairs of shims or bushings (not shown) may be provided for positioning in the bore 40 defined between the clamp sections 36 and 38. Thus when the clamp sections 36 and 38 are bolted together by means of the bolts 42, the clamp sections 36 and 38 together with the shims or bushings will form a solid and durable engagement with the support tube 16 of an appropriate size and configuration.

The frame 22 includes a tubular main strut 44 which extends generally upwardly during use as shown in FIG. 1.

The main strut 44 has its one end connected to the wheel axis 26 to thereby pivotally mount the support wheel 24 on the frame 22.

Figure 2:
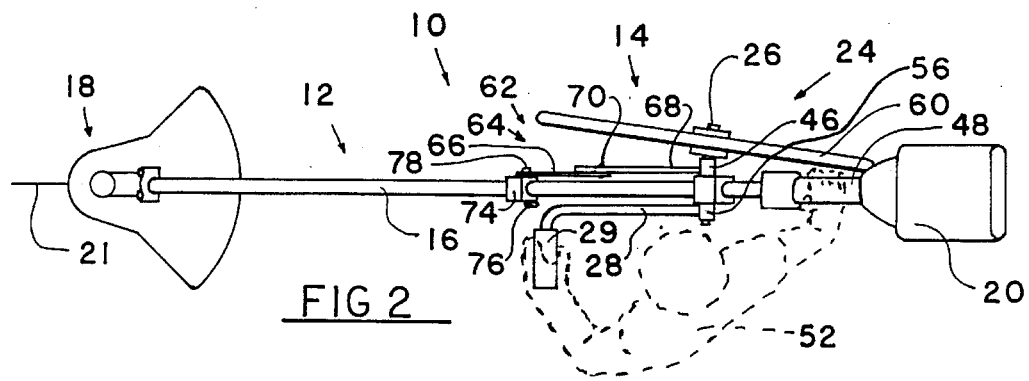
FIG. 2 shows a plan view of the apparatus of FIG. 1.

The main strut 44 of the frame 22 has a pivot sleeve 46 provided at its other end which would constitute its uppermost end during normal use (as shown in FIG. 2 and FIG. 4).

The pivot sleeve 46 is pivotally mounted on the pivot shaft 34. The pivot sleeve 46 can thus be pivotally displaced about the pivot shaft 34 to allow the trimmer device 12 to pivot relatively to the frame 22 and thus to pivot relatively to the wheel axis 26.

The pivot axis 35 extends generally parallel to the wheel axis 26 so that the clearing device 12 can be displaced in the leading direction towards the cutter head 18, or in the trailing direction away from the cutter head 18, to adjust the position of the center of gravity of the clearing device 12 relatively to the wheel axis 26.

Such an adjustment can readily be made if the user, for example, prefers to have the center of gravity of the clearing apparatus 10 slightly forward or slightly backward of the wheel axis 26.

Such an adjustment can also readily be made if, for example, the clearing head 18 is changed for a clearing head of a different size, shape or mass.

Such an adjustment would therefore generally be desirable where a clearing head in the form of cutter head 18 of the line type, is replaced with a heavier duty cutter head of the line type, or is replaced with a heavier duty cutter head of the blade type for cutting vegetation in the form of shrubs, brush, weeds and the like.

In most of the Echo trimmer devices, the cutter head 18 has a first bevel gear which is driven by the drive shaft, and has a second bevel gear which cooperates with the first bevel gear, and has the cutter connected thereto. The cooperating bevel gears thus ensure that the rotating drive shaft drives the cutter. This type of trimmer is called a straight shaft trimmer.

It will be appreciated, however, that any other conventional form of drive connection may be provided between the drive shaft and the cutter head. For example, a curved shaft may be used comprising a curved elongated support member and a flexible drive shaft. In the same way, any other form of conventional driving mechanism may be provided for the drive shaft to drive the cutter whether the cutter is in the form of a line cutter, a blade cutter, or the like.

The apparatus 10 further includes a control handle 48 for use in controlling the trimmer device 12.

In the one preferred embodiment illustrated in FIGS. 1 to 5 of the drawings, the control handle 48 is mounted on the support tube 16 between the motor 20 and the pivot mount 30. In this preferred embodiment of the invention, where the trimmer 12 is a trimmer of the type made by Echo, the control handle 48 is of the standard type which is mounted on the support tube 16 of the Echo trimmer.

The control handle 48 includes a throttle 50 for controlling the motor 20.

The trimmer device 12 is mounted on the carriage 14 by means of the pivot mount 30 so that the net center of gravity of the trimmer device 12 and the carriage 14, and thus the trimmer apparatus 10, is supported substantially at its center of gravity on the single support wheel 24 during use.

The guide handle 28 extends upwardly and forwardly from the center of gravity to a comfortable height and position for an operator 52 to hold the guide handle grip 29 of the guide handle 28. The operator 52 is shown in FIG. 2 of the drawings in outline handling the trimmer apparatus 10 during use. The control handle 48 is positioned on the support tube 16 so that it is at a convenient position along the support tube 16 and at a convenient height to be handled by the operator 52.

In the preferred embodiment, the guide handle grip 29 of the guide handle 28, and the control handle 48 are arranged so that when they are gripped by an operator 52 in his two hands, the operator 52 will be standing substantially at or proximate the center of gravity of the trimmer apparatus 10. In other words, the operator will be standing at least partially in line with part of an axial projection of the support wheel 24 during normal use. Preferably, as shown in FIG. 2, the operator 52 will, during normal use, be standing substantially in line with part of an axial projection of the support wheel 24 during normal use, or will be standing substantially in line with the wheel axis 26 of the support wheel 24 as shown in FIG. 2.

In use, therefore, the operator 52 can face in a generally forward direction towards the cutter head 18. This arrangement can provide the advantage that the operator can operate the clearing apparatus by walking normally in the generally forward direction while swinging the cutter head from side to side.

This position of the support tube 16, motor 20 and cutterhead 18 provides a comfortable feel with the weight of the apparatus supported on the support wheel 24. However, if the trimmer device were used manually without the carriage—whether with or without a harness—this position would put too much strain on the arms and shoulders of the operator.

A hand held trimmer generally feels most comfortable when the support tube is substantially in line with the shoulders of an operator. Therefore, instead of walking in a forward direction the operator must step sideways to move in the direction of the cutting head.

The guide handle 28 is adjustably mounted on the pivot mount 30 and forms part of the carriage 14.

The pivot mount 30 has an adjustment shaft which, in this embodiment, is conveniently an extension of the pivot shaft 34, and which extends from the pivot mount 30. The adjustment shaft has the guide handle 28 pivotally mounted thereon by means of a split guide handle sleeve 56 on the guide handle 28.

The height and position of the guide handle grip 29 can therefore be adjusted to suit an operator, by adjusting the pivotable displacement of the guide handle 28 about the adjustment shaft 34. When the guide handle grip 29 is in its desired adjusted position, the split guide handle sleeve 56 can be locked relatively to the adjustment shaft 34 by means of an adjustment lock 58 (as shown in FIG. 4 and FIG. 5). The adjustment lock 58 is in the form of a threaded bolt 57 which extends through a bore in one lock flange 55 and engages with a threaded bore in a second lock flange 59 to draw the lock flanges 55 and 59 together and thus clamp the split guide handle sleeve 56 onto the adjustment shaft 34.

The frame 22 may be formed out of any rigid light-weight material such as steel or aluminum or a synthetic plastic material, or a reinforced synthetic plastic material.

In a presently preferred embodiment of the invention, tubular strut 44 of the frame 22 is formed out of aluminum or thin walled steel tubing of round section.

The support wheel 24 is, in this presently preferred embodiment of the invention, in the form of a plastic 24 inch diameter wheelchair wheel having spokes 53.

As can be seen particularly in FIG. 2 of the drawings, the support wheel 24 has its plane, which extends substantially vertically during use, laterally spaced to one side of the vertical plane of the elongated support tube 16 during use. In the presently preferred embodiment as illustrated in FIGS. 1 through 5 of the drawings, the lateral spacing of the plane of the support wheel 24 relatively to the plane of the elongated support tube 16, is about 5 inches. This lateral spacing allows more clearance during use for the leg and foot of an operator 52. It therefore increases the convenience of use of the trimmer apparatus 10. It also allows the trimmer apparatus 10 to be tilted slightly towards the operator 52 during use for ease of operation. Thus, during use, while the trimmer apparatus 10 will be supported at approximately its center of gravity on the support wheel 24, the trimmer apparatus 10 will be tilted slightly towards the operator 52 during use, and thus the center of gravity of the trimmer apparatus 10 will be tilted slightly towards the operator 52 during use. Applicant believes that this arrangement improves the ease of operation of the trimmer apparatus 10.

The support wheel 24 has a conventional wheelchair molded polyurethene foam tire 60.

Because the trimmer 12 is fairly lightweight compared to the weight normally to be supported by a conventional wheelchair wheel, the tire 60 may instead be filled with a foam synthetic plastic material.

The preferred embodiment of the apparatus 10, as illustrated in the drawings, can provide a number of advantages.

By using a single light weight support wheel 24 which is relatively large, the apparatus 10 can easily traverse obstacles such as rocks, stones and bumps which are encountered during use of the apparatus 10.

Because the apparatus 10 pivots about a single contact point of the support wheel 24 on the ground, the cutter head 18 can readily be displaced from side to side during use for the cutter head 18 to have its maximum effect without the operator 52 having to take unnecessary steps. The reach of the cutter head 18 is therefore enhanced over that provided by other prior wheel supported devices.

Because the trimmer device 12 and carriage 14 are supported substantially at their center of gravity on the support wheel 24, the apparatus 10 is very easy to control and does not require the operator 52 to carry any significant portion of the weight of the apparatus 10 during use.

During use, therefore, the operator 52 can easily steer the apparatus past or over obstacles. Further, by using the guide handle 28 and the control handle 48, and because the operator 52 is standing substantially in line with the axis 26 of the axle of the wheel 24, he or she can readily lift the apparatus 10 over obstacles or the like. This is facilitated by the fact that both hands of the operator are substantially in line with the center of gravity of the device during use.

The preferred embodiment has the further advantage that the carriage 14 is of simple and inexpensive construction, and can be light enough where it can be readily handled, not only for using the apparatus 10, but also for lifting the apparatus 10 when the apparatus is to be transported or stored.

The preferred embodiment of the apparatus 10 can provide the further advantage that because the apparatus is supported on a single support wheel 24, there is little resistance to the lateral displacement of the cutter head 18 during use, even when obstacles are in the path of the support wheel 24. In addition, when the apparatus 10 is used on a slope, whether it be a steep slope or a gradual slope, the single wheel allows the apparatus to be maintained in a plane which is substantially or generally at right angles to the surface of the slope while such a slope is being traversed. Thus, allowing the cutter head to be maintained where it substantially matches the plane of the slope.

By having the support tube 16 fixed to the carriage 14 so that it cannot pivot about its elongated axis, the operator 52 has better control during use particularly when the cutter head comes into contact with brush or obstacles.

Because the operator stands virtually at the center of gravity of the apparatus 10 during use, the apparatus allows virtually the same degree of lateral and forward movement as would be provided by a hand held trimmer.

The apparatus 10 as illustrated in FIGS. 1 to 5 of the drawings can provide the further advantage that the trimmer device 12 can readily be removed from the carriage 14 either to use the trimmer device 12 as a hand-held trimmer or for storage purposes. In the same way, the carriage 14 can be used with a variety of models and makes of trimmers merely by adapting the clamp sections 36 and 38, by adapting shims or bushings or other inserts to be inserted into the bore 40 of the clamp sections 36 and 38, or by adapting the pivot mount 30 itself.

The carriage 14 is therefore a versatile apparatus in itself which can readily be adapted for use with a variety of different models and makes of standard trimmers, particularly those of the line cutter type, as well as trimmers of the cutter blade type. The carriage 14 is also versatile since, as discussed below, it can also be used to support blower devices of various types.

The apparatus 10 provides the further advantage that it puts no relative displacement in the vertical plane of the support tube 16 relatively to the carriage 14. Thus, all vertical movement of the cutter head 18 relatively to the ground during use can be provided by pivotal displacement of the frame 22 and thus the support tube 16, about the axle 26 of the support wheel 24.

As can be seen particularly in FIG. 2 of the drawings, the plane of the support wheel 24 is preferably at an acute angle to the vertical plane of the elongated support tube 16 during use.

This acute angle is conveniently between about 0° and about 20° for ease of use of the trimmer apparatus 10. The angle between the plane of the support wheel 24 and the vertical plane of the elongated support tube 16 is preferably, as shown in FIG. 2, between about 10° and about 15°.

Axis 26 preferably extends at an angle of about 100° to about 105° to the plane of the frame 22 so that, during use, the vertical plane of the support wheel 24 will be at an angle of about 10° to about 15° to the vertical plane of the elongated support tube 16. This also means that the pivot axis 35 will then extend at an angle of between about 10° to about 15° to the wheel axis 26. Thus the apparatus 10 is supported by the wheel 24 during use so that the operator will tend to move in the forward direction in the direction of the clearing head while the support wheel will move alongside the operator in a path substantially parallel to the path of movement of the operator.

Because the wheel axis 26 is not exactly at right angles to the plane of the frame 22, and is not at right angles to the axis of the elongated support tube 16, the wheel axis 26 is not absolutely parallel to the pivot axis 35 but is only generally parallel thereto. Indeed, in the preferred embodiment as illustrated in FIGS. 1 through 5 of the drawings, the wheel axis 26 is generally parallel to the pivot axis 35 by being at an angle of about 10° to 15° thereto.

The trimmer apparatus 10 further includes a locking device 62 for locking the trimmer device 12 relatively to the pivot mount 30 in a desired adjusted position during use.

In the preferred embodiment of the invention as illustrated in FIGS. 1 through 5 of the drawings, the locking device 62 comprises an adjustable locking strut 64 which extends between the main strut 44 of the frame 22 and the elongated tube 16 of the trimmer device 12.

The adjustable locking strut 64 comprises a pair of over center locking toggle levers 66 and 68.

The locking toggle levers 66 and 68 are pivotally connected to each other about a toggle pivot 70.

The toggle lever 68 is pivotally connected to the main strut 44 of the frame 22 about a pivot connection 72.

The adjustable locking strut 64 further includes a sliding clamp 74 which is slidably positioned on the elongated support tube 16.

The sliding clamp 74 has a wingbolt 76 for fixing the sliding clamp in a desired position along the elongated support tube 16.

The toggle lever 66 is pivotally connected to the sliding clamp 74 by means of a pivot connection 78, as shown in FIG. 2.

It will readily be appreciated that the adjustable locking strut 64 could equally be connected to the main strut 44 by means of a similar sliding clamp arrangement 74. In this embodiment, the main strut 44 could be provided with a series of positioning holes for receiving a spring-loaded positioning bolt of the sliding clamp arrangement. This would allow the sliding clamp to be positioned at any desired position along the main strut 44.

The adjustable locking strut 64 has a lock mechanism 80 of conventional detent type as used in cooperating over center locking toggle levers. Thus, as shown in FIG. 1 of the drawings, the toggle lever 66 and 68 are in their over center locking position, where the detent lock mechanism 80 is engaged and the locking device 62 maintains the trimmer device 12 in its operatively supported position for effective use of the trimmer apparatus 10.

When it is desired to collapse the trimmer apparatus 10, this can be done by simply lifting the toggle levers 66 and 68 where they are connected at the toggle pivot 70.

This movement shortens the adjustable locking strut 64 and therefore causes the support wheel 24 to be displaced in the leading direction towards the cutter head 18. At the same time, of course, the main strut 44 pivots about the wheel axis 26 and pivots about the pivot axis 35.

Figure 3:
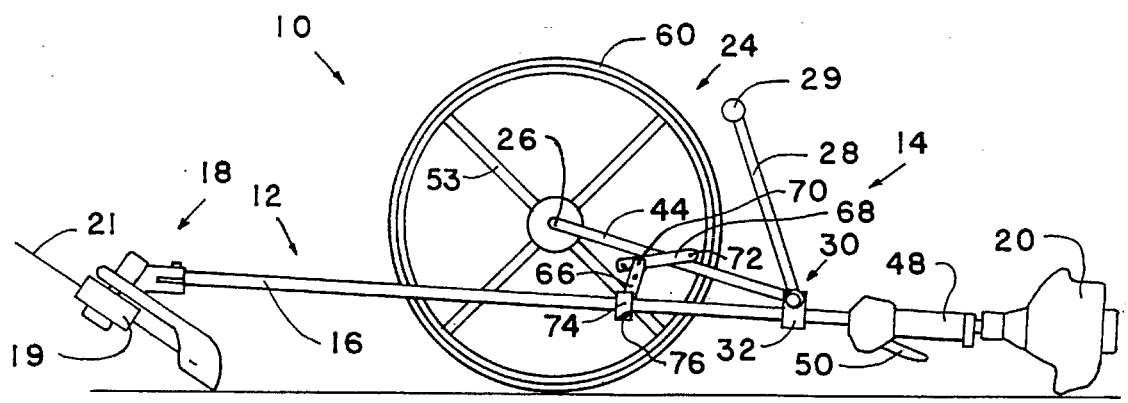
FIG. 3 shows a side elevation of the apparatus of FIG. 1 in its collapsed position for starting, maintenance, transport or storage.

This movement continues until the trimmer apparatus 10 is in its collapsed compact position as shown in FIG. 3, where the cutter head 18 and motor 20 of the power unit are resting on the supporting surface on which the support wheel 24 is resting.

In this collapsed position, it is easy to fill the motor 20 with gasoline and to attend to maintenance of the motor 20 or the cutter head 18.

In this collapsed position, it all so very convenient to start the motor 20 since the control handle 48 can be held in one hand while the motor 20 is supported on the ground, and the pull cord can be pulled with the other hand.

While the trimmer apparatus 10 is being used, it can readily be collapsed into its collapsed position while the operator does some intervening task, without having to switch off the motor 20.

It will also be appreciated that the trimmer apparatus 10 can readily be transported and stored in its collapsed position.

To restore the trimmer apparatus 10 into its operative position from its collapsed position, the motor 20 can simply be raised by means of the control handle 48 until the toggle lever 66 and 68 fall into their over center locked position where they can be locked with the trimmer apparatus 10 in its operative position for use.

It is therefore a particular advantage of the apparatus 10 as illustrated in FIGS. 1 through 5 of the drawings, that the particular arrangement not only allows for the center of gravity of the apparatus to be adjusted relatively to the wheel axis, as desired, but it also readily allows the apparatus 10 to be displaced between its operative and its collapsed positions.

Figure 6:
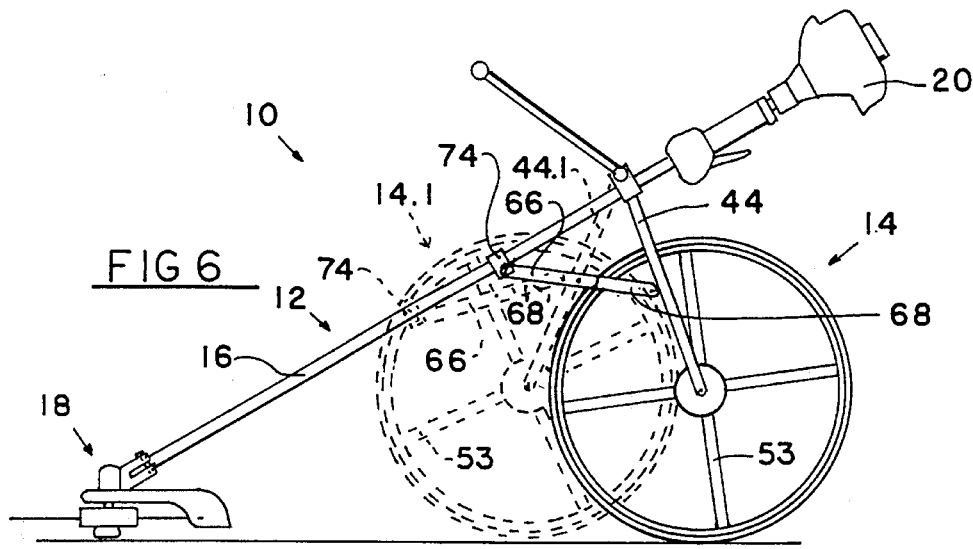
FIG. 6 shows a side view of the clearing apparatus of FIG. 1, in which the carriage is shown in a first position for a clearing head of a lighter mass, and is shown in dotted lines in a second position for a clearing head of a heavier mass to illustrate how the position of the center of gravity of the clearing device is adjusted when the clearing head is lighter, and when the clearing head is heavier.

The adjustment of the position of the center of gravity of the apparatus 10 is illustrated more specifically in FIG. 6 of the drawings. This adjustment will therefore be described in more detail with particular reference to FIG. 6.

The frame 22 thus comprises the main strut 44, the locking strut 64 and part of the support tube 16 arranged in the form of an adjustable triangle.

This arrangement not only provides stability for the frame, but allows for effective and easy adjustment as described.

In an embodiment of the invention, as will be described in FIG. 10, a carriage in accordance with this invention is illustrated in which a mounting strut is shown as part of the frame 22 in place of the elongated support tube 16. It will be appreciated, however, that as shown in FIG. 1 to FIG. 5, the carriage can equally be provided where an elongated support member, such as the tube 16, comprises the mounting strut of the frame.

In FIG. 6 of the drawings, corresponding reference numerals to those used in FIGS. 1 through 5 of the drawings, have been employed.

In FIG. 6 of the drawings, the clearing apparatus has been illustrated, for convenience, in the form of a trimmer apparatus 10.

In FIG. 6, the trimmer apparatus 10 is shown in solid lines with a carriage 14 which corresponds generally with the carriage 14 as illustrated in FIGS. 1 through 5 of the drawings. In addition, however, the carriage is shown in an adjusted position in dotted lines where it has been identified as the carriage 14.1.

The carriage 14 is shown in an appropriate adjusted position for a cutter head 18 of a particular mass, and is shown as the carriage 14.1 in an adjusted position for a cutter head 18 of greater mass.

Since the cutter heads 18 for the two different examples are of different masses it will readily be appreciated that for the trimmer apparatus 10 to be supported about its center of gravity on the wheel axis 26 during use, the wheel axis 26 of the support wheel 24 will require to be further towards the leading direction, that is the direction of the cutter head 18, when the cutter head 18 is replaced with another cutter head 18 which is somewhat heavier.

Thus, in use, when the cutter head 18 is removed, and replaced with the heavier cutter head 18, the wingbolt 76 will be loosened so that the sliding clamp 74 can be displaced along the support tube 16 in the direction of the cutter head 18. While such displacement occurs, the main strut 44 of the frame 22 will be pivotally displaced relatively to the pivot axis 35 and relatively to the wheel axis 26 as the support wheel 24 moves in the forward direction towards the cutter head 18.

The position of the center of gravity of the trimmer apparatus 10 can be adjusted relatively to the wheel axis 26 until the center of gravity of the apparatus 10 is again above the wheel axis 26 when the carriage 14 has been displaced from the position of the carriage 14 into the position of the carriage 14.1. Thus the trimmer apparatus 10 is once again supported on the support wheel 24 about its center of gravity.

In this desired adjusted position, the wingbolt 76 can be tightened to fix the sliding clamp 74 in position on the elongated support tube 16 and the trimmer apparatus 10 is then again ready for use.

The adjustment of the center of gravity is important when components of a clearing device are exchanged for heavier or lighter components. The quick and effective adjustment means that the objectives of this invention can readily be obtained, namely the support of the clearing apparatus substantially about its center of gravity, when components of the clearing device are interchanged.

This ease of adjustment is further convenient when a user prefers to have the center of gravity slightly in the leading direction or slightly in the trailing direction relatively to the wheel axis 26. This adjustment can therefore accommodate user preference and can be useful when clearing is down on a downslope or in an upslope direction.

This simple adjustment relatively to the wheel axis, is also of importance when the carriage 14 of this invention is to be used with clearing devices of different makes, different types, or different masses.

Thus, for example, if the carriage 14 is used with trimmer devices 12 which have support tubes 16 of different lengths, or which have different angles between the plane of the cutter head and the axis of the elongated support tube, the simple adjustment will allow for the cutter head or clearing head to be at the appropriate inclination to the surface being cleared.

As can readily be seen in FIG. 6, since the main strut 44 is relatively long compared to the amount of adjustment needed when the support wheel 24 is displaced forwardly or backwardly for adjusting the position of the center of gravity, the change in height of the pivot mount 30 will be very small.

Figure 7:
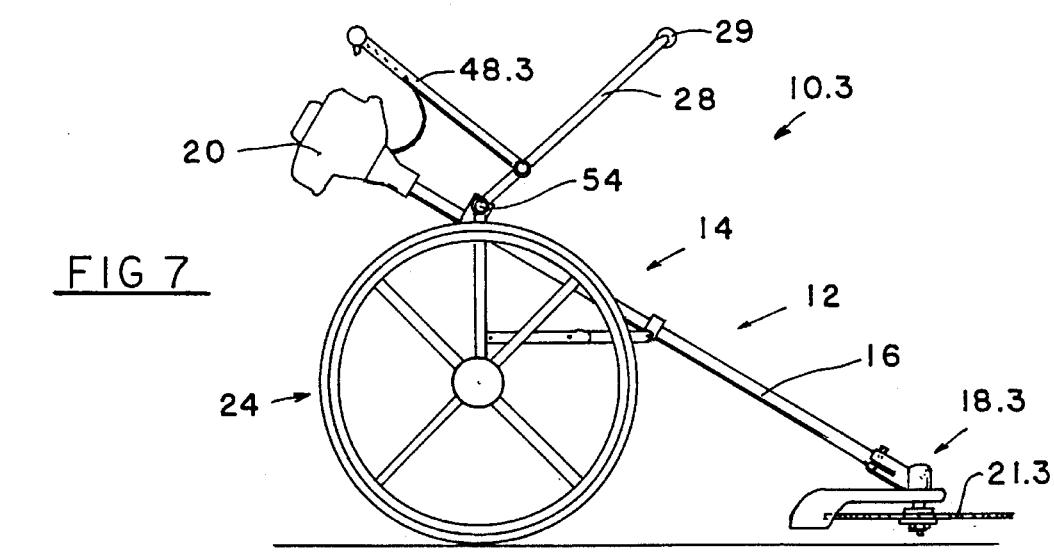
FIG. 7 shows a side elevation of an alternative embodiment of the clearing apparatus of FIG. 1, in which both the guide and control handles form part of the carriage, and in which the clearing head comprises an annular-toothed blade for brush cutting.

With particular reference to FIG. 7 of the drawings, reference numeral 10.3 refers to an alternative preferred embodiment of a clearing apparatus in accordance with this invention.

The clearing apparatus 10.3 of FIG. 7 corresponds in many respects with the clearing apparatus 10 of FIG. 1. Corresponding parts are therefore indicated by corresponding reference numerals.

The essential difference between the clearing apparatus 10.3 and the clearing apparatus 10, is that in the clearing apparatus 10.3 both the guide handle 28 and the control handle 48.3 form part of the carriage 14.

As shown in FIG. 7, the control handle 48.3 is mounted on the guide handle 28 so that they can be adjusted together about the adjustment shaft 54.

It will be readily appreciated that, if desired, the guide handle 28 and the control handle 48.3 may be pivotally displaceable relatively to each other to allow for greater adjustment of their relative positions.

The pivotal adjustment of the guide handle 28 relatively to the control handle 48.3 can be achieved in any one of a number of ways known to those skilled in the art. For example, the control handle 48.3 may be pivotally mounted on a pivot shaft on the guide handle 28, and can include a locking bolt of any conventional type for locking them relatively to each other in a desired adjusted position.

The trimmer apparatus 10.3 further differs from the trimmer apparatus 10 in that the cutter head 18.3 comprises an annular toothed blade cutter head for use in cutting heavier vegetation such as shrubs, brush, stalks, smaller trees and the like.

The annular toothed blade 21.3 may be a blade of any suitable type having circumferentially positioned teeth, having circumferentially spaced sets of teeth, or the like. The blade may also, for example, be a blade cutter having a plurality of circumferentially spaced blades mounted on the cutter.

The trimmer apparatus 10.3 shown in FIG. 7, includes as the trimmer device 12, a brush cutter of the type currently supplied by Shindaiwa under Model No. RC45. However, to facilitate handling of the trimmer device 12 and the use thereof for brush cutting, the elongated support tube 16 has been shortened by approximately 16 inches. Because of the ease of adjustment of the center of gravity of the trimmer device 12 relatively to the support wheel 24, shortening of the support tube 16 presents no problem in having the trimmer apparatus 10.3 supported on the support wheel 24 about its center of gravity for easy and effective use despite the relatively heavy cutter head 18.3.

Figure 8:
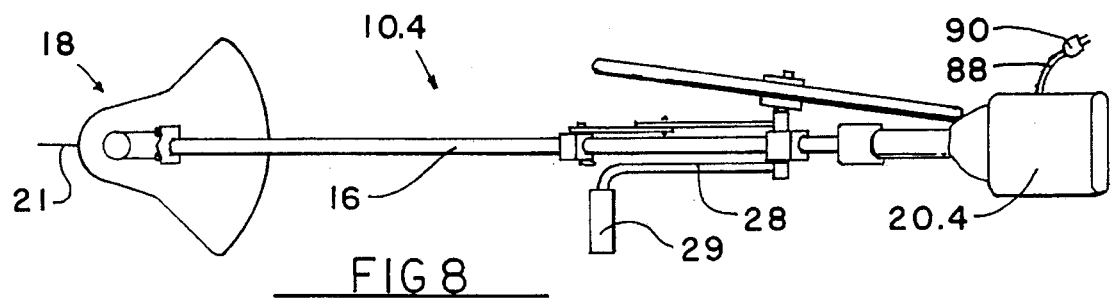
FIG. 8 shows a plan view of yet a further alternative embodiment of the invention, in which the power unit is in the form of an electric motor.

With reference to FIG. 8 of the drawings, the trimmer apparatus 10.4 illustrated in FIG. 8 corresponds in the majority of respects with the trimmer apparatus 10 as illustrated in FIG. 1.

The essential difference is that the trimmer apparatus 10.4 includes a power unit 20.4 which is in the form of an electric motor for connection to a source of electrical power as indicated by the electrical cord 88 and the plug 90.

In this embodiment, since the power unit 20.4 is still mounted at the trailing end of the support tube 16, the drive connection will be the same as the drive connection as used in the embodiment of FIG. 1.

Figure 9:
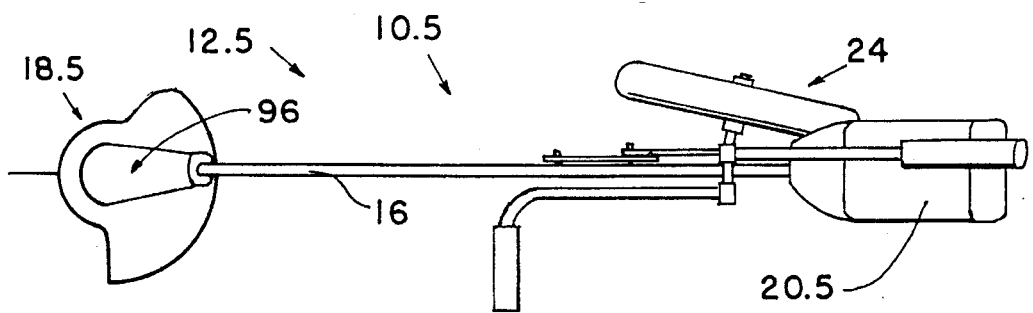
FIG. 9 shows a plan view of yet a further alternative embodiment of the invention in which the power unit comprises a rechargeable battery.

With reference to FIG. 9 of the drawings, the trimmer apparatus 10.5 as illustrated in FIG. 9 corresponds essentially with the trimmer apparatus 10 as illustrated in FIG. 1, except that the power unit 20.5 differs.

In the trimmer apparatus 10.5, the power unit 20.5 comprises a rechargeable battery.

In the embodiment of FIG. 9, the power unit 20.5 is shown comprising only the rechargeable battery.

In this embodiment, the cutter head 18.5 is shown having an electric motor 96 as part of the cutter head 18.5.

In this embodiment, therefore, the drive connection which extends along the support tube 16, is a set of electrical leads to convey power between the rechargeable battery 20.5 and the electric motor 96 of the cutter head 18.5.

Because of the mass of the power unit 20.5, it is easier to arrange the trimmer device 12.5 about its center of gravity on the support wheel 24 if the mass of the rechargeable battery can be balanced against cutter head 18.5 and the mass of the electric motor 96 at the cutter head 18.5.

The trimmer apparatus 10.5 includes a battery housing 94 which may be pivotally suspended on the trailing end of the support tube 16.5 so that the battery 20.5 will tend to remain in a vertical orientation during use.

Since the entire apparatus 10.5 is supported substantially about its center of gravity on the wheel 24, both the electric motor 96 and the battery 20.5 can be of the heavy-duty type thereby permitting effective and heavy-duty operation of the apparatus 10.5.

In this embodiment the center of mass of the apparatus 10.5 can be low and can provide a number of advantages in handling the apparatus. This arrangement can also be applied to the other embodiments of the invention, including the vacuum and blower embodiments, provided sufficient clearance is maintained between the power unit or motor and the ground for the height variations which may be required for the clearing head.

Figure 10:
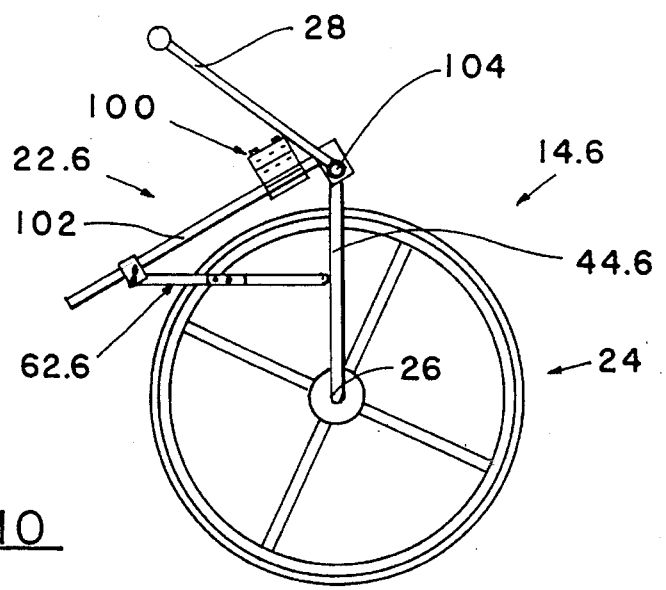
FIG. 10 shows a side elevation of a carriage for supporting a clearing device.

With reference to FIG. 10 of the drawings, this figure refers to yet a further alternative embodiment of the invention in the form of a carriage 14.6 for supporting a clearing device.

The carriage 14.6 is a carriage for supporting a clearing device of the type comprising an elongated support member, a clearing head mounted at the leading end of the support member, a power unit mounted at the trailing end of the support member, and a drive connection for connecting the power unit to the clearing head.

The carriage 14.6 comprises a frame 22.6, a single support wheel 24 having a wheel axis 26 about which the support wheel 24 is rotatively mounted on the frame 22.6 to support the frame 22.6 during use, and a mount bracket 100 for mounting an elongated support member of such a clearing device on the frame 22.6 for the support wheel 24 to support the carriage 14.6 and such a mounted clearing device proximate the net center of gravity of the carriage and such a mounted clearing device during use.

The frame 22.6 comprises a main strut 44.6, a mounting strut 102 which is pivotally connected to the main strut 44.6 about pivot connection 104 so that the mounting strut 102 is adjustable relatively to the main strut 44.6 for adjusting the position of the center of gravity of such a mounted clearing device relatively to the wheel axis 26 for use, and a locking strut 62.6 to lock the main strut 44.6 relatively to the mounting strut 102 in a selected adjusted position.

The carriage 14.6 further has a handle 28 to be grasped by an operator for guiding the carriage 14.6 during use, the handle 28 being positioned so that an operator grasping the handle for guiding the carriage will be positioned to one side of the support wheel and substantially in line with part of an axial projection of the support wheel 24 during normal use.

The mount bracket 100 may be a bracket of any suitable type for mounting an elongated support member of a clearing device to the carriage 14.6.

In FIG. 10 of the drawings, the mount bracket 100 is shown to comprise two split clamps which are mounted along the mounting strut 102. Each split clamp 100 has a bore for receiving an elongated support member, and has bolts for bolting the split clamps together to bolt the elongated support member in position in the split clamps.

The split clamps may be used with shims or bushings to allow the split clamps to be used with elongated support members of differing cross sectional areas or configurations.

The locking strut 62.6 is conveniently displaceable along the mounting strut 102 as discussed with reference to FIGS. 1 to 6. Alternatively, or additionally, the locking strut 62.6 may be slidably connected to the main strut 44.6 so that it can also be slidably displaced relatively to the main strut 44.6.

In an alternative embodiment, the locking strut 62.6 may also be in the form of a telescopic strut to allow ready adjustment of the effective length of the locking strut 62.6.

By adjusting the locking strut 62.6, the relative relationship between the main strut 44.6 and mounting strut 102 can be adjusted about the pivot connection 104 for adjusting the relationship between the net center of gravity of the carriage 14.6 and a mounted clearing apparatus, relatively to the wheel axis 26 of the support wheel 24.

In addition, as discussed with reference to FIGS. 1 to 5 of the drawings, and particularly as shown in FIG. 3, the locking strut 62.6 is collapsible to allow the main strut 44.6 to be collapsed relatively to the mounting strut 102 for collapsing the carriage 14.6 into a compact unit.

In an alternative preferred alternative embodiment of the carriage 14.6 as illustrated in FIG. 10, the mounting strut 102 may comprise a part of an elongated support member of a clearing apparatus. In this embodiment the elongated support member is an integral part of the frame 22.6 of the carriage 14.6.

In this embodiment, the elongated support member may of course include the other components of a clearing apparatus, namely a clearing head and a power unit, with a drive connection between them.

The carriage 14.6 as illustrated in FIG. 10 and as described with reference to FIG. 10, has the advantage that the triangulation of the main strut 44.6, mounting strut 102, and locking strut 62.6 provides a stable and sturdy arrangement. It provides the further advantage that the main strut 44.6 can readily be adjusted relatively to the mounting strut 102 to provide easy adjustment of the net center of gravity relatively to the wheel axis during use, and to allow the carriage 14.6 to be displaced between its operative erected position, and its collapsed position for storage, maintenance, etc.

With reference to FIG. 11 of the drawings, reference numeral 10.7 refers generally to a trimmer apparatus which corresponds substantially with the trimmer apparatus 10 as illustrated in FIG. 1 of the drawings.

Corresponding parts of the trimmer apparatus 10.7 which correspond with those parts of the trimmer apparatus 10 as illustrated in FIG. 1, have been indicated by corresponding reference numerals except that in some cases the suffix "0.7" has been added after the reference numeral.

The trimmer apparatus 10.7 corresponds in all respects with the trimmer apparatus 10 except that the trimmer apparatus 10.7 is purely in the form of an edge trimmer apparatus for trimming edges. The cutter head 18 of the trimmer apparatus 10 has therefore been replaced with an edger head 18.7 in the edger apparatus 10.7.

The edger head 18.7 is shown having an edger blade 21.7 of conventional type, mounted therein. It will be appreciated, however, that instead of the blade 21.7, the edger head 18.7 could include a blade of any other suitable type, such as a blade of the line type, or the like.

The trimmer apparatus 10.7 includes a guide wheel 106 which is rotatably mounted on an axle 108.

The axle 108 is mounted on the edger head 18.7 so that the guide wheel 106 can guide the height of the edger head 18.7 during use.

The axle 108 is adjustably mounted on the edger head 18.7 so that the height of the edger 18.7 can be adjusted for particular applications during use.

The edger apparatus 10.7 has a leading portion of the elongated support member 16.7 curved so that the plane of the blade 21.7 is parallel and substantially in line with the plane of the support wheel 24 during use.

With reference to FIG. 12 of the drawings, reference numeral 10.8 refers to yet a further alternative embodiment of a clearing apparatus in accordance with this invention.

The clearing apparatus 10.8 corresponds substantially with the clearing apparatus 10 as illustrated in FIG. 1. Corresponding parts are therefore indicated by corresponding reference numerals, except that the suffix "0.8" has sometimes been added to the reference numeral.

In the embodiment of the apparatus 10.8 as illustrated in FIG. 12, the frame 14.8 differs from the frame 14 as illustrated in FIG. 1, in that the frame 14.8 includes a resilient portion to provide a resilient relationship between the support wheel and a mounted clearing device during use.

The resilient portion is provided by the main strut 44.8 comprising two telescopically connected parts, namely an innertelescopic part 110 which is telescopically located within an outer telescopic part 112.

Within the outer telescopic part 112, a resilient mechanism is incorporated to resiliently control telescopic displacement of the inner telescopic part 110 relatively to the outer telescopic part 112.

The mechanism may comprise any suitable or convention type for providing the appropriate degree of resilience. Thus, for example, the mechanism may comprise a compression spring which is located within the outer telescopic part 112 and is connected to the inner telescopic part 110. In an alternative example, the outer telescopic part may include a pneumatic or hydraulic compression or extension system to hydraulically or pneumatically control telescopic displacement of the inner telescopic part 110 relatively to the outer telescopic part 112.

The main strut 44.8 further includes a limit mechanism of any conventional type to limit the range of relative telescopic movement of the inner and outer telescopic parts 110 and 112.

In the embodiment shown in FIG. 12, the limit mechanism is indicated by reference numeral 114, and comprises a slot 116 which is provided in the outer wall of the outer telescopic part 112, and a pin 118 which extends from the inner telescopic part 110 and is slidably positioned within the slot 116.

The movement of the pin 118 along the slot 116 therefore limits the relative telescopic movement of the parts 110 and 112 as dictated by the length of the slot 116.

The cooperation between the pin 118 and the slot 116 further limits the relative pivotal displacement of the inner telescopic part 110 relatively to the outer telescopic part 112 during use.

The apparatus 10.8 as illustrated in FIG. 12 provides the advantage that the apparatus 10.8 is softer to use and provides an effective shock absorbing characteristic during use; also, the operator can raise or lower the rear portion of the apparatus in relation to the wheel. This can be helpful when clearing on uneven terrain. With reference to FIG. 13 of the drawings, reference numeral 10.9 refers to yet a further alternative embodiment of the invention.

The apparatus 10.9 as illustrated in FIG. 13 of the drawings, corresponds substantially with the apparatus 10 as illustrated in FIG. 1. Like parts are therefore indicated by like reference numerals, except that the suffix "0.9" has been used after the reference numerals in some cases.

The apparatus 10.9 differs from the apparatus 10 in that the wheel 24 of the apparatus 10 has been replaced by a castor wheel 24.9.

The castor wheel 24.9 is mounted to the main strut 44.9 about its wheel axis 26.9 on a castor mechanism 120.

The castor mechanism 120 comprises a castor pin 122 which is rotatably mounted within a sleeve defined by a lower end of the main strut 44.9. The castor pin 122 is mounted within the sleeve so that the castor pin 122 is axially located within the sleeve.

The caster mechanism 120 further includes a fork. The fork comprises a transverse plate 124 which is mounted on the castor pin 122, and a pair of castor wheel struts 126 which extend from the transverse plate 124.

The struts 126 have the wheel axis 26.9 rotatably mounted on them.

While a fork arrangement comprising a pair of castor wheel struts 126 is preferred, an alternative arrangement could have a single castor wheel strut extending from the transverse plate 124, and having the wheel axis 26.9 mounted thereon.

The apparatus 10.9 as illustrated in FIG. 13, can provide the advantage that the castor wheel 24.9 will tend to trail the direction of movement at any time, thereby facilitating movement of the apparatus 10.9 in any desired direction during use.

With reference to FIG. 14 of the drawings, reference numeral 10.10 refers generally to yet a further alternative embodiment of an apparatus in accordance with this invention. The apparatus 10.10 is in the form of a blower apparatus.

The blower apparatus 10.10 corresponds substantially with the trimmer apparatus 10 as illustrated in FIG. 2 of the drawings. Corresponding parts have therefore been indicated by means of corresponding reference numerals to those used in FIG. 2.

The blower apparatus 10.10 has a blower head 128 which has replaced the cutter head 18 of the apparatus 10 as shown in FIG. 2.

In one embodiment of the invention, the cutter head 18 as shown in FIG. 2 can simply be disconnected from the elongated support member 16 by loosening the clamping bolts which clamp the clamping portion of the head 18 onto the elongated support member 16, with drawing the cutter head 18, and replacing it with a blower head 128 having a corresponding clamping arrangement in the blower head 128.

Alternatively, however, as illustrated in FIG. 14 of the drawings, the blower head 128 is shown having a shaft section 132 extending therefrom. The shaft section 132 corresponds in cross section with the elongated support member 16.10.

The elongated support member 16.10 further has a clamping sleeve 130 mounted on its leading end.

The clamping sleeve 130 has a bore within which the shaft section 132 is removably clamped.

The clamping sleeve 130 may have any conventional or suitable mechanism for clamping the shaft section 132 removably within the bore of the clamping sleeve 130. Thus, for example, the clamping sleeve 130 may include a spring loaded button and a wingnut clamp. Alternatively, for example, the clamping sleeve 130 may comprise a split clamp, a g-clamp, or the like.

In the embodiment shown in FIG. 14 of the drawings, the apparatus 10.10 can have any desired form of head, whether it be a cutter head, an edger head or a blower head, removably mounted thereon by means of the clamping sleeve 130. Each head to be clamped to the clamping sleeve 130 would therefore have a shaft section 132 extending therefrom.

This arrangement provides the advantage that the shaft section 132 can be tailored to the particular head from which it extends. Thus, for example, the shaft section 132 may be bent or curled to position the head at a particular position or in a particular inclination for a desired application.

The blower head 128 may be a blower head of any conventional or suitable type. As illustrated in FIG. 14, the blower head 128 comprises a blower housing 134. The blower housing 134 has a blower nozzle 136 extending therefrom, and has intake holes 138 on top of the housing 134.

An impeller 140 is rotatably mounted within the housing 134 to drive from the intake holes 138 along a suitably shaped duct to the nozzle 136.

The embodiment of the invention as illustrated in FIG. 14, provides the advantage that a blower apparatus is provided which can be easily and effectively handled during use. It provides the further advantage that the particular head can readily be replaced by means of the clamping sleeve 130, so that any other type of head can be rapidly and effectively mounted on the apparatus 10.10 for different applications.

With the arrangement of the apparatus in accordance with this invention, where the operator is positioned substantially in line with the lateral projection of the single wheel which supports the apparatus, the operator has substantial lateral movement of the clearing head or cutter head in the case of a trimmer apparatus. The operator can move the cutter head from one side of his body to the other side in one continuous motion. This allows the operator to cut a swath of grass or weeds up to a width of approximately twice the distance from the operator to the cutter head while standing in the same spot. While using the apparatus of this invention, the operator can have free movement of the apparatus without having to support any significant portion of the weight of the apparatus. Further, the operator can control the height of the clearing head during use by simply controlling the difference in the height of the control and guide handle. At the same time, since the guide and control handles are positioned on opposed sides of the center of gravity of the apparatus, and since the operator is positioned substantially at the center of gravity of the apparatus, the operator can, during use, readily lift the apparatus by means of the handles to traverse obstacles, steps, rocks and the like.

The positioning of an operator relatively to the apparatus of this invention can provide the further significant advantage that the operator can turn the apparatus through 360° in either direction by remaining substantially in the same place. This can be a substantial advantage in handling the apparatus of this invention.

What is claimed is:

1. A clearing apparatus comprising a clearing device for use in clearing operations, a carriage to which the clearing device is mounted for the carriage to support the clearing device during use, and a handle for use in guiding the apparatus during use;

the clearing device comprising an elongated support member, a clearing head mounted at a leading end of the support member, a power unit mounted at a trailing end of the support member, and a drive connection for connecting the power unit to the clearing head;

the carriage comprising a frame, a single support wheel having a wheel axis about which the support wheel is rotatably mounted on the frame to support the frame on a support surface during use, and a pivot mount mounting the clearing device to the frame such that the clearing apparatus can be supported proximate its center of gravity on the support wheel during use;

the pivot mount having a pivot axis extending generally parallel to the wheel axis, and the clearing device being pivotally displaceable about the pivot axis to allow the clearing device and frame to be pivotally displaced about the wheel axis between an operative position where the clearing apparatus is supported proximate its center of gravity on the support wheel during use with the pivot axis above the wheel axis, and a compact collapsed inoperative position in which the pivot axis has been lowered relatively to the wheel axis until the pivot axis is below the wheel axis and the clearing head and power unit are resting on the support surface on which the support wheel is supported; and the handle being positioned for an operator grasping the handle for guiding the apparatus during use, to be positioned to one side of the support wheel and at least partially in line with part of an axial projection of the support wheel during normal use.

2. A clearing apparatus according to claim 1, in which the carriage includes a locking device for locking the clearing device relatively to the pivot mount in the operative position of the clearing apparatus.

3. A clearing apparatus according to claim 2, in which the locking device comprises an adjustable locking strut extending between the frame and the clearing device.

4. A clearing apparatus according to claim 3, in which the adjustable locking strut comprises an over center locking toggle strut which is displaceable between a locked operative position and a collapsed position when the clearing apparatus is collapsed into its compact inoperative position.

5. A carriage for supporting a clearing device of the type comprising an elongated support member, a clearing head mounted at a leading end of the support member, a power unit mounted at a trailing end of the support member, and a drive connection for connecting the power unit to the clearing head;

the carriage comprising a frame, a single support wheel having a wheel axis about which the support wheel is rotatably mounted on the frame to support the frame during use, and a mount bracket for mounting an elongated support member of such a clearing device on the frame for the support wheel to support the carriage and such a mounted clearing device proximate the net center of gravity of the carriage and such a mounted clearing device during use;

the frame being substantially defined by a main strut, a mounting strut which is pivotally connected to the main strut to be adjustable relatively to the main strut for adjusting the position of the center of gravity of such a mounted clearing device relatively to the wheel axis for use, and a locking strut to lock the main strut relatively to the mounting strut in a selected adjusted position;

and the carriage having a handle to be grasped by an operator for guiding the carriage during use, the handle being positioned so that an operator grasping the handle for guiding the carriage will be positioned to one side of the support wheel and at least partially in line with part of an axial projection of the support wheel during normal use.

6. A carriage according to claim 5, in which the locking strut is displaceable to permit the main strut to be collapsed relatively to the mounting strut for collapsing the carriage into a compact inoperative position.

7. A carriage according to claim 5, in which the mount bracket is fixed to the mounting strut for mounting an elongated support member of such a clearing device to the mounting strut.

8. A carriage according to claim 5, in which the mounting strut comprises part of an elongated support member of a clearing device.

9. A carriage according to claim 5, in which the support wheel is mounted to the frame as a castor wheel.

10. A carriage according to claim 5, in which the locking strut comprises an adjustable locking strut.

11. A carriage according to claim 10, in which the adjustable locking strut includes a sliding clamp for slidably receiving the elongated support member of such a clearing device, and in which the sliding clamp includes a fastener for fastening it in a desired position along such an elongated support member during use.

12. A carriage according to claim 10, in which the adjustable locking strut comprises an over center locking toggle.

13. A carriage according to claim 5, in which the handle comprises a guide handle and a control handle.

14. A carriage according to claim 13, in which the guide handle is positioned to be on a leading side and the control handle is positioned to be on a trailing side of the center of gravity of the carriage and such a mounted clearing device during use.

15. A carriage according to claim 5, in which the locking strut includes a sliding clamp which is slidably engaged with one of the other struts, and which includes a fastener to fasten it in a desired adjusted position along that strut.

16. A carriage according to claim 5, in which the wheel axis is mounted to the main strut.

17. A carriage for supporting a clearing device of the type comprising an elongated support member, a clearing head mounted at a leading end of the support member, a power unit mounted at a trailing end of the support member, a drive connection for connecting the power unit to the clearing head, and a handle to be grasped by an operator during use;

the carriage comprising a frame, a single support wheel having a wheel axis about which the support wheel is rotatably mounted on the frame to support the frame during use, and a mount bracket for mounting an elongated support member of such a clearing device on the frame for the support wheel to support the carriage and such a mounted clearing device proximate the net center of gravity of the carriage and such a mounted clearing device during use;

the frame being substantially defined by a main strut, a mounting strut which is pivotally connected to the main strut to be adjustable relatively to the main strut for adjusting the position of the center of gravity of such a mounted clearing device relatively to the wheel axis for use, and a locking strut to lock the main strut relatively to the mounting strut in a selected adjusted position;

the handle being positioned so that an operator grasping the handle for guiding the carriage will be positioned to one side of the support wheel and at least partially in line with part of an axial projection of the support wheel during normal use.

18. A carriage according to claim 17, in which the locking strut comprises an adjustable locking strut.

19. A carriage according to claim 18, in which the adjustable locking strut includes a sliding clamp for slidably receiving the elongated support member of such a clearing device, and in which the sliding clamp includes a fastener for fastening it in a desired position along such an elongated support member during use.

20. A carriage according to claim 18, in which the adjustable locking strut comprises an over center locking toggle.

21. A carriage according to claim 17, in which the handle comprises a guide handle and a control handle.

22. A carriage according to claim 21, in which the guide handle is positioned to be on a leading side and the control handle is positioned to be on a trailing side of the center of gravity of the carriage and such a mounted clearing device during use.

23. A clearing apparatus according to claim 17, in which the locking strut includes a sliding clamp which is slidably engaged with one of the other struts, and which includes a fastener to fasten it in a desired adjusted position along that strut.

24. A carriage according to claim 17, in which the locking strut is displaceable to permit the main strut to be collapsed relatively to the mounting strut for collapsing the carriage into a compact inoperative position.

25. A carriage according to claim 17, in which the mount bracket is fixed to the mounting strut for mounting an elongated support member of such a clearing device to the mounting strut.

26. A carriage according to claim 17, in which the mounting strut comprises part of an elongated support member of a clearing device.

27. A carriage according to claim 17, in which the wheel axis is mounted to the main strut.

28. A clearing apparatus comprising a clearing device for use in clearing operations, a carriage to which the clearing device is mounted for the carriage to support the clearing device during use, and a handle for use in guiding the apparatus during use;

the clearing device comprising an elongated support member, a clearing head mounted at a leading end of the support member, a power unit mounted at a trailing end of the support member, and a drive connection for connecting the power unit to the clearing head;

the carriage comprising a frame, a single support wheel having a wheel axis about which the support wheel is rotatably mounted on the frame to support the frame during use, and a mount bracket mounting the clearing device to the frame such that the clearing apparatus can be supported proximate its center of gravity on the support wheel during use;

the frame being substantially defined by a main strut, a mounting strut which is pivotally connected to the main strut to be adjustable relatively to the main strut for adjusting the position of the center of gravity of such a mounted clearing device relatively to the wheel axis for use, and a locking strut to lock the main strut relatively to the mounting strut in a selected adjusted position;

the handle being positioned for an operator grasping the handle for guiding the apparatus during use, to be positioned to one side of the support wheel and at least partially in line with part of an axial projection of the support wheel during normal use.

29. A clearing apparatus according to claim 28, in which the locking strut comprises an adjustable locking strut.

30. A clearing apparatus according to claim 29, in which the adjustable locking strut comprises an over center locking toggle which is displaceable between a locked operative position and a collapsed position.

31. A clearing apparatus according to claim 29, in which the locking strut includes a sliding clamp which is slidably engaged with the elongated support member, and which includes a fastener to fasten it in a desired adjusted position along the elongated support member.

32. A clearing apparatus according to claim 28, in which the handle is positioned for an operator grasping the handle for guiding the apparatus during use, to be partially in line with an axial extension of the wheel axis during use.

33. A clearing apparatus according to claim 28, in which the handle comprises a guide handle and a control handle.

34. A clearing apparatus according to claim 33, in which both the guide handle and the control handle are mounted on the carriage.

35. A clearing apparatus according to claim 33, in which the guide handle is mounted on the carriage and the control handle is mounted on the clearing device.

36. A clearing apparatus according to claim 33, in which the guide handle is positioned on a leading side and the control handle is positioned on a trailing side of the center of gravity of the clearing apparatus during use.

37. A clearing apparatus according to claim 33, in which the handles are positioned so that an operator grasping the handles for operating the apparatus will be positioned to be partially in line with an axial extension of the wheel axis during use.

38. A clearing apparatus according to claim 33, in which both the guide handle and the control handle are mounted on the clearing device.

39. A clearing apparatus according to claim 28, in which the power unit comprises a motor for driving the clearing head during use, and in which the drive connection comprises a drive shaft operatively connecting the power unit to the clearing head.

40. A clearing apparatus according to claim 28, in which the clearing head includes an electric motor for driving the clearing head during use, in which the power unit comprises a battery, and in which the drive connection comprises electrically conducting leads between the battery and the electric motor.

41. A clearing apparatus according to claim 28, which is in the form of a trimmer apparatus for cutting vegetation, with the clearing device being in the form of a trimmer device for cutting vegetation, and with the clearing head being in the form of a cutter head.

42. A clearing apparatus according to claim 41, in which the cutter head comprises a cutter of the line-type.

43. A clearing apparatus according to claim 41, in which the cutter head comprises a cutter of the blade type.

44. A clearing apparatus according to claim 28, which is in the form of a blower apparatus, with the clearing device being in the form of a blower device, and with the clearing head being in the form of a blower head.

45. A clearing apparatus according to claim 28, in which the mount bracket is in the form of a pivot mount having a pivot axis extending generally parallel to the wheel axis, and the clearing device being pivotally displaceable about the pivot axis for adjusting the position of the center of gravity of the clearing device relatively to the wheel axis.

46. A clearing apparatus according to claim 45, in which the pivot axis extends at an angle of between about 0 and about 20 degrees to the wheel axis.

47. A clearing apparatus according to claim 45, in which the pivot axis extends at an angle of between about 10 and about 15 degrees to the wheel axis.

48. A clearing apparatus according to claim 28, which is in the form of an edge trimmer apparatus for trimming edges, and in which the clearing head is an edge trimmer positioned to be driven in a substantially vertical plane during use.

49. A clearing apparatus according to claim 28, in which the support wheel is mounted to the frame as a castor wheel.

50. A clearing apparatus according to claim 28, in which the mounting strut comprises part of the elongated support member of the clearing device.

51. A clearing apparatus according to claim 28, in which the wheel axis is mounted to the main strut.

* * * * *